United States Patent
Katz et al.

(10) Patent No.: US 6,496,872 B1
(45) Date of Patent: *Dec. 17, 2002

(54) COMPUTER SYSTEM FOR AUTOMATICALLY INSTANTIATING TASKS DESIGNATED BY A USER

(75) Inventors: Glenn Katz, Campbell, CA (US); Michael Gough, Ben Lomond, CA (US); Josh Jacobs, Berkeley, CA (US); John Powers, Monte Sereno, CA (US); Patricia Coleman, Montara, CA (US); James Miyake, San Jose, CA (US); Greg Ames, Redwood City, CA (US); Jon Kalb, Pleasanton, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/242,957

(22) Filed: May 16, 1994

(51) Int. Cl.$^7$ ................................................ G06F 17/30
(52) U.S. Cl. ....................................................... 709/318
(58) Field of Search .................. 395/650; 709/310–320, 709/328, 329; 345/762, 763

(56) References Cited

U.S. PATENT DOCUMENTS

| | | | |
|---|---|---|---|
| 5,317,688 A | * 5/1994 | Watson et al. ............... | 345/337 |
| 5,367,635 A | * 11/1994 | Bauer et al. ................. | 709/221 |
| 5,404,532 A | * 4/1995 | Allen et al. ................. | 713/200 |
| 5,421,013 A | * 5/1995 | Smith ......................... | 709/107 |
| 5,423,043 A | * 6/1995 | Fitzpatrick et al. ......... | 709/317 |
| 5,485,618 A | * 1/1996 | Smith ......................... | 395/700 |
| 5,546,519 A | * 8/1996 | Berry ......................... | 345/763 |
| 5,790,116 A |   8/1998 | Malone et al. ............... | 345/763 |
| 5,794,001 A |   8/1998 | Malone et al. ............... | 345/762 |

OTHER PUBLICATIONS

Moskowitz, David & David Kerr, "OS/2 2.1 Unleashed", Sams Publishing Company. pp. 606–608, 1993.*

Moskowitz, David, et al, "OS/2 2.1 Unleashed", Sams Publishing, pp. 606–608, 1993.

Schindler, Esther, "Organize Your Life", OS/2 Magazine, vol. 1, No. 1, Dec. 1993, pp. 64–68.

Hesketh, Richard, "Perly–UNIX with Buttons", Software Practice & Experience, 21(1991) Nov., No. 11, pp. 1165–1187.

Stearns, Glenn R., "Agents and the HP NewWave Application Program Interface", Hewlett–Packard Journal, Aug. 1989, pp. 32–37.

* cited by examiner

Primary Examiner—St. John Courtenay, III
(74) Attorney, Agent, or Firm—Burns, Doane, Swecker & Mathis, LLP

(57) ABSTRACT

A computer-user interface facilitates interaction between the user and the computer in a manner which enables the computer to assist the user in accomplishing desired goals. Based upon a particular task to be performed, the computer interviews the user to obtain the information pertinent to that particular task. Once the information is provided to the computer, it works with the user to automatically perform desired tasks in response to triggering events designated by the user. In addition, the computer can notify the user whenever a task is being carried out. Any executable function can be designated by the user as the object of a task. The initiation of this task can be carried out in response to any programmatically detectable event, or trigger, which is also designated by the user. As a further feature, the user has the ability to select from among a number of different types of notification to be provided whenever the task is being performed. With the flexibility offered by this arrangement, he user can customize the operation of a computer to suit his or her particular needs.

5 Claims, 18 Drawing Sheets

FIG. 9

SCHEDULED ITEMS

COMPUTER SYSTEM FOR AUTOMATICALLY INSTANTIATING TASKS DESIGNATED BY A USER

FIELD OF THE INVENTION

The present invention is directed to the interface between a computer and a an user of that computer, and more particularly to an interface which provides the user with the ability to automatically accomplish tasks with the computer.

BACKGROUND OF THE INVENTION

Typically, most personal computers are employed as passive tools. Users of the computers are required to directly manipulate interface elements in order to accomplish desired tasks. Often, the discovery of new features and services available through a computer only takes place through trial and error. As a result, the computers are not being utilized in the most efficient manner, because the users do not understand how to take advantage of the power that is available to them. In other words, the vast potential of the computer often goes unrealized, because users are unfamiliar with all of the capabilities at their disposal or unable to employ them effectively.

In order to increase the efficiency with which computers are used, it is desirable to revise the fundamental manner in which users interact with their computers. More particularly, rather than using the computer as a passive tool that is directly manipulated by the user, it is preferable to employ the computer as a cooperative partner that assists in accomplishing the tasks desired by the user. To this end, it is desirable to provide a mechanism by which computers can be set up to accomplish tasks automatically, without requiring the user to instruct or otherwise manipulate the computer each time the task is to be performed.

Some computer programs provide certain capabilities in this regard. For example, some electronic mail programs contain a scheduling feature by which a server computer is automatically accessed at predetermined times of the day to determine whether the user has any incoming mail. If so, that mail is downloaded to the user's computer, and the connection with the server computer is then terminated. Other application programs also offer an automatic scheduling feature.

As another example, most operating systems provide the capability to have certain actions carried out upon startup. For example, the user can designate that certain programs be launched and running when the computer is first started. In a similar manner, some applications programs can be configured to automatically open a particular file when they are launched.

While these various features provide the user with the ability to automate certain tasks, they are each limited in their applicability. More particularly, the scheduling feature of the electronic mail program is hard coded into the software for that program, and therefore only available within the context of that particular program. Furthermore, the program must be running in order for the scheduled tasks to be carried out. This requirement may be undesirable since the program will use some of the computer's memory while it is running, thereby reducing the amount available for other programs. It also places a practical limit on the number of different tasks that can be set up, since each different program that has a scheduled task must be running in memory in order for its task to be implemented.

Similarly, the ability to launch applications upon startup is limited to that one particular instance. It does not provide the user with the capability to have tasks automatically carried out at other times or in response to other events.

It is desirable, therefore, to provide a mechanism for configuring a computer to automatically carry out any task that may be desired by a user in response to a variety of different events or at any desirable time, without requiring the user to have any familiarity with the programming of computers. To have applicability to any of the variety of tasks that might be desired by a user, such a mechanism should preferably function at the level of the computer's operating system, rather than be tied to specific applications programs or the like.

BRIEF STATEMENT OF THE INVENTION

In pursuit of this objective, the present invention provides a computer-user interface that facilitates interaction between the user and the computer in a manner which enables the computer to assist the user in accomplishing desired goals. Through the medium of this interface, the user describes the goals and the tasks to be accomplished. Based upon a particular action to be performed, the computer interviews the user to obtain the information pertinent to that particular task. Once the information is provided to the computer, it works with the user to create a task that automatically performs the desired actions in response to triggering events designated by the user. In addition, the task notifies the user whenever the action is being carried out.

The computer-human interface has an open architecture which provides the user a great deal of flexibility in the creation of automated tasks. Generally speaking, any executable function can be designated by the user as the subject of a task. The initiation of this task can be carried out in response to any programmatically detectable event, or trigger, which is also designated by the user. As a further feature, the user has the ability to select from among a number of different types of notification to be provided whenever the task is being performed. With the flexibility offered by this arrangement, the user can customize the operation of a computer to suit his or her particular needs.

Each of the elements of a task, e.g. the action to be performed, the trigger and the notification, is stored as a separate object at the operating system level. These various objects can be selected by the user and associated with a file to add behavior to the file. Since these elements are operated upon at the system level, they can be activated at any time in response to the triggering event, even though the associated file is itself dormant. Furthermore, the file itself need not have any awareness of the scheduling of the task. Thus, no customization of the file itself, e.g. added code, is required to enable that file to be associated with a task.

The overall effect of the present invention, therefore, is to enable the user to concentrate on the accomplishment of goals, rather than focus upon how to use a computer. Further features of the invention, and the advantages offered thereby, are described in detail hereinafter with reference to embodiments of the invention illustrated in the accompanying figures.

BRIEF DESCRIPTION OF THE DRAWINGS

FIGS. 8 and 9 are illustrations of a task system window;

DETAILED DESCRIPTION

The present invention provides an interface that enables computer users to automate the operation of their computer to replay sequences of actions, as well as to delegate the performance of tasks to the computer so that they are carried out upon the occurrence of certain triggering events or at certain times. To facilitate an understanding of the invention, specific examples are described hereinafter with reference to their implementation on a Macintosh® brand computer manufactured by Apple Computer, Inc. It will be appreciated, however, that the practical applications of the invention are not limited to this particular embodiment. Rather, the application of the invention to other types of computers and operating systems will become readily apparent to those of ordinary skill in the art.

Basically speaking, the computer-human interface of the present invention provides a vehicle through which the user can configure a computer to carry out desired tasks. This functionality can be implemented in the context of a more general interface that assists the user in understanding the operation of his or her computer, and the manner in which to control it to perform desired objectives. In this regard, such an interface preferably contains features which address the needs of a wide variety of users, from the novice to the advanced user. With reference to the novice user, the interface can provide information that enables the user to carry out basic operations necessary to the proper functioning of the computer. For the more advanced user, the interface enables the user to automatically set up tasks to be performed. In general, therefore, the interface provides assistance to users so that they can utilize their computers more effectively.

One example of such an interface within which the principles of the present invention can be implemented is known as Apple Guide. This interface provides a help system that guides the user in a step-by-step manner to accomplish desired operations. For further information regarding this interface, reference is made to commonly assigned, copending applications Ser. No. 08/010,063, filed Jan. 27, 1993, Ser. No. 08/056,367, filed Apr. 30, 1993, and Ser. No. 08/059,542, filed May. 10, 1993, the disclosures of which are incorporated herein by reference. Preferably, the features of the present invention are incorporated into a interface of the type disclosed in these applications.

Figure 1A:
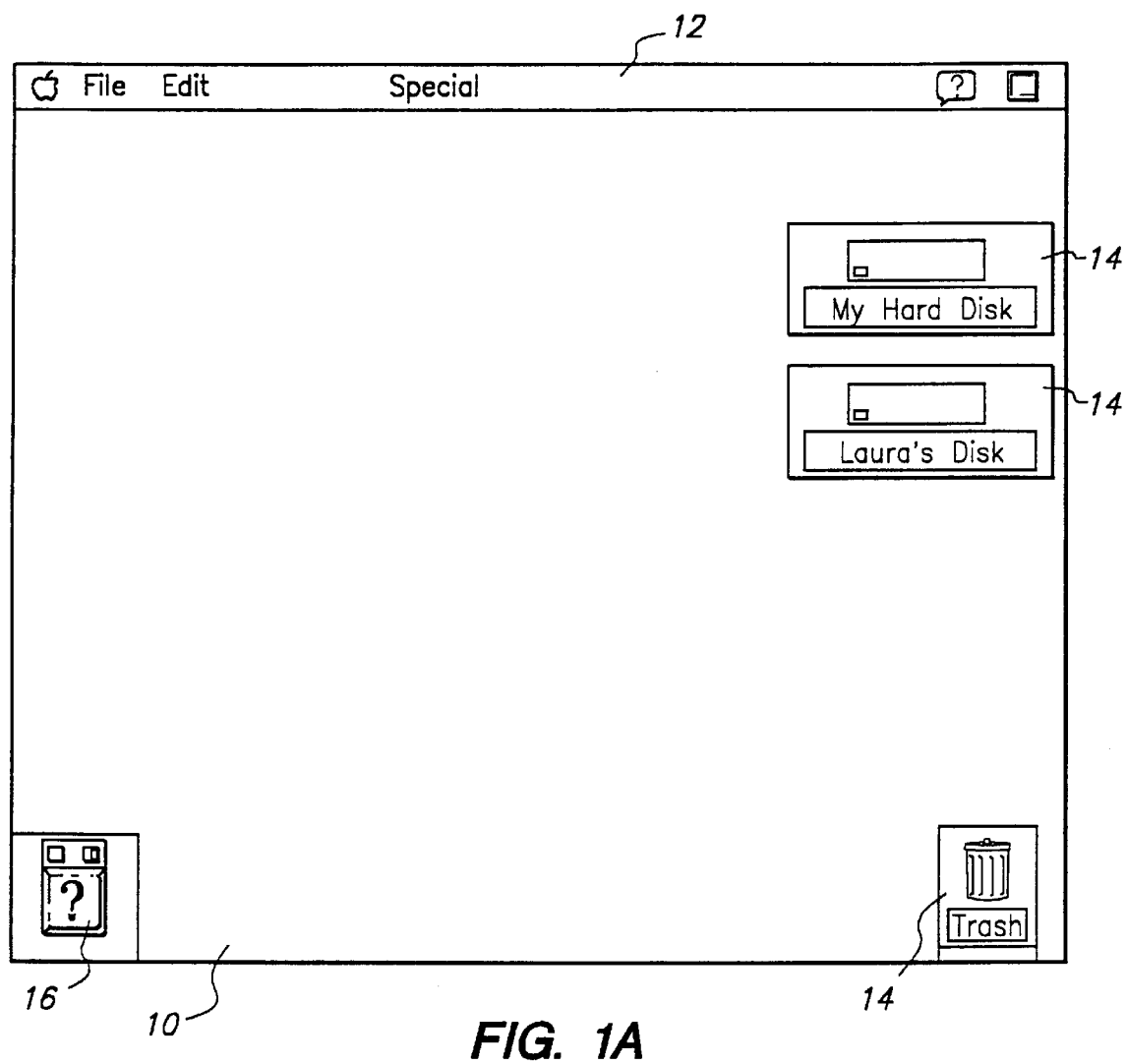
FIG. 1A is an illustration of a desktop display containing a button for accessing automatic task building features in accordance with the present invention.

To provide ease of use for all types of computer users, access to the features provided by the present invention can be provided through a simple interface object. One example of such an object is illustrated in FIG. 1A. Referring thereto, this figure illustrates a display screen of the type that is typically presented to a user by an interface which employs a desktop metaphor to represent objects stored in the computer. As shown in FIG. 1A, the major portion of the screen comprises an area that is known as the desktop 10. Located at the upper portion of the desktop is a menu bar 12 which provides the user with access to basic functions for controlling the operation of the computer. Various icons 14 on the desktop represent objects accessible by the computer user, such as disk drives, folders, files and application programs. As is well known in this art, access to the menu items and icons can be provided by means of a cursor that is controlled by a suitable input device manipulated by the user, such as mouse, pen or the like.

Figure 1B:
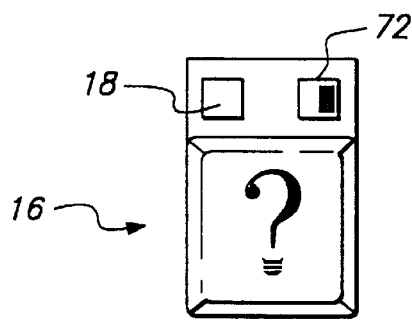
FIG. 1B is an enlarged view of the assist button.

Also illustrated on the desktop is an assist button 16, which is shown in an enlarged view in FIG. 1B. This button provides the user with access to the guidance and assistance features of the interface. Preferably, this button is situated on a palette that floats above all other objects on the desktop, such as windows and icons, so that it is always accessible by the user. To permit the user to remove the button from the desktop, the palette can be provided with a close button 18, which functions in a well-known manner to remove the display of that feature. Once the button has been closed, access to it can be gained through an item on the menu bar 12, such as a help menu.

Figure 2:
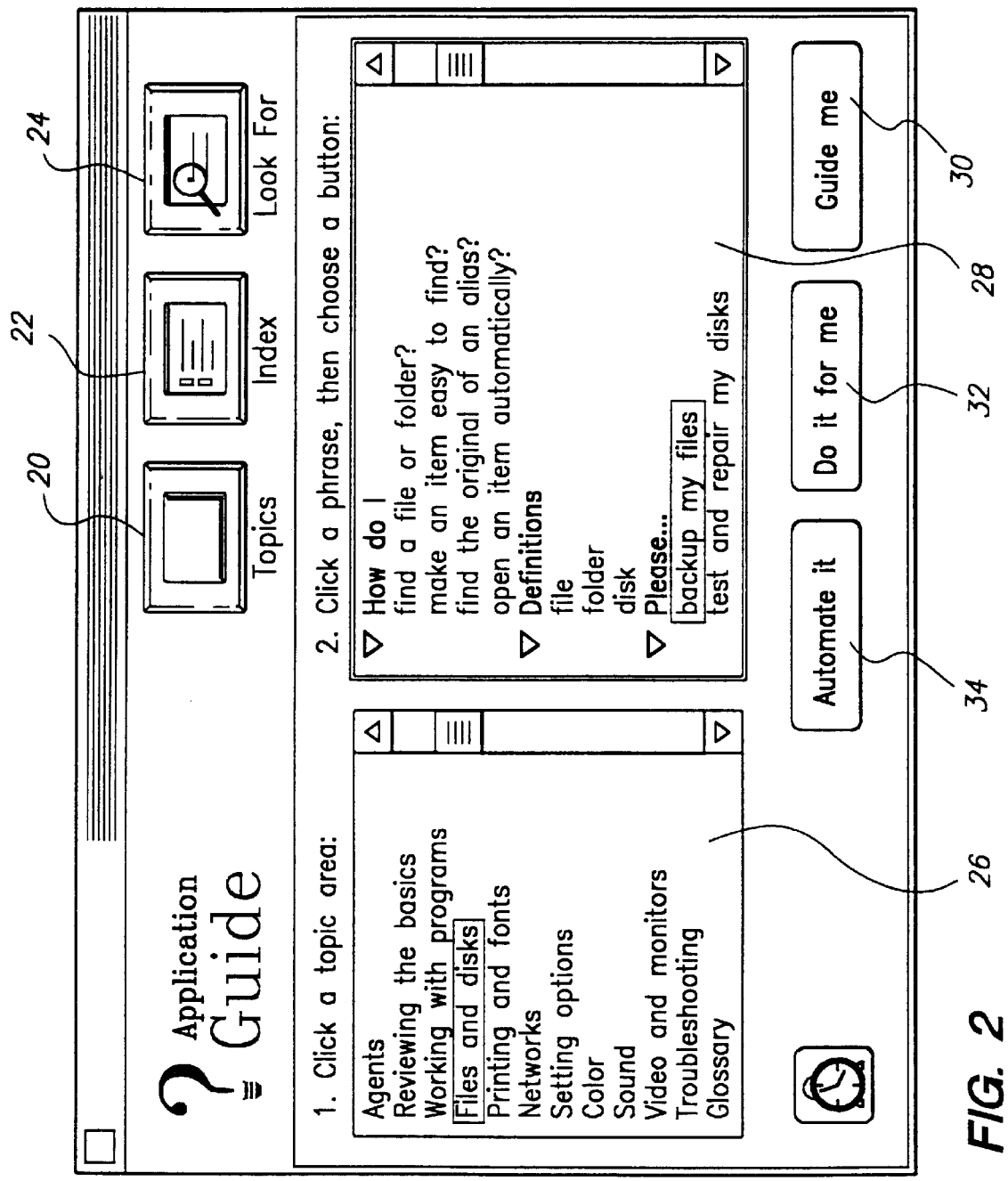
FIG. 2 is an illustration of an access window.

To call up the assistance features of the interface, the user actuates the assist button 16, for example, by clicking a mouse button while a cursor pointer is positioned over the assist button. Upon doing so, an access window, such as that shown in FIG. 2, is presented to the user. The access window is also a system window that floats above all application windows and icons on the desktop when it is called by the user.

The access window presents a list of predefined questions, problems and tasks that are appropriate to the context within which the computer is being used. Thus, for example, when the user is working on the desktop itself, the contents of the access window may relate to basic functions associated with the operation of a computer, such as those illustrated in FIG. 2. On the other hand, if the user is working within a particular application, such as a word processing program, the contents of the access window can pertain to functions associated with that particular application. This information can be provided as part of the program, for example in a help file. Thus, the contents of the access window are always context sensitive.

In the specific example illustrated in FIG. 2, the upper region of the access window contains three buttons 20–24 which enable the user to switch between different search modes. A first button 20, which is illustrated as being highlighted in FIG. 2, enables the user to select areas of inquiry by general topics. The middle button 22 causes information to be presented to the user alphabetically, or in some other indexed fashion. The rightmost button 24 enables the user to input a particular query upon which the computer conducts a search to locate topics related thereto.

The middle portion of the access window contains two panes of information. The left pane 26 presents the information defined by the particular one of the three search mode buttons actuated by the user. Thus, in the example of FIG. 2, the left pane contains a listing of the various topics about which the user can obtain information. The user can select one of the topics identified in this pane. In response thereto, the right pane 28 presents a list of tasks that match the selected topic. In the particular example of FIG. 2, the user has selected the topic "files and disks." In response thereto, the right pane presents the user with a choice of more specific items of information under this general topic. For further information regarding the functionality of these features of the access window, reference is made to the patent applications identified previously.

The bottom of the access window contains three user-assistance mode buttons. The rightmost button 30, labeled "Guide Me," leads the user through step-by-step instructions for performing a particular task, such as those provided by the Apple Guide system described in the aforementioned patent applications. This type of operation is appropriate when the users want to learn how to accomplish that task. The middle button 32, labeled "Do It For Me," leads the user through a path that provides as much automation of the task as possible, streamlining the steps that are required to complete the task. This mode is appropriate when a user wants to get a particular task accomplished, without desiring to learn how it is done. Upon actuation of this button, the task is carried out one time. Before implementing the task, it may be necessary for the computer to solicit information from the user regarding the parameters of the task. For example, if the requested task is to back up files, the computer can request the user to specify the files to be backed up, and the destination disk onto which they are to be copied. Upon entry of this information, the computer carries out the task without further input by the user.

The third button 34, labeled "Automate It", enables the user to automate the performance of repetitive tasks. When it is actuated, it causes the system to create an automated task that is carried out whenever a specified trigger condition occurs. Similar to the "Do It For Me" operation, the type of assistance provided by this button carries out an interview sequence with the user, to obtain the necessary information regarding the task. However, in this case additional choices are presented which allow the user to specify a triggering condition for the initiation of the task, and a notification or logging that is provided when the task occurs.

The automated task feature of the interface is based upon three main concepts, namely tasks, triggers and assistants. Tasks are actions or sequences of actions that can be programmatically launched at some time specified by the user. A task is composed of three items of information which specify (i) what is to be done, (ii) when it is to be done and (iii) how the user should be notified. The "what" specification for a task describes the variables that make the task unique. These variables might include the names of folders or directories whose contents should be backed up, the name of a folder to look for on a network, or the list of people whose electronic mail addresses are considered to be important, for example. The "when" specification for a task describes a time or event condition that triggers the performance of an automated task. The "notification" specification describes user preferences regarding how they want to be notified when the task is running, and whether the notification should be logged for later review.

A trigger is any event that can be programmatically detected and used to initiate the performance of an automated task. For example, a time-based trigger can specify a single time or a repeating time interval. Other, more complicated triggers can be based upon specific events, such as system start-up, system shut-down, or the launch of an application. They can also be based upon complex conditions to be monitored. For example, the trigger can monitor the amount of free space on a hard disk, and initiate a task when the available space drops below a specified threshold. Other triggers can detect specific keystroke combinations, or wait until another task has been completed.

A third feature of automated tasks, i.e., an assistant, is a collection of one or several templates of potential automated tasks and interview sequences to collect the parameters needed to specify instances of these tasks. Each task template represents a skill or a service that the assistant is capable of providing. When an assistant is called by a user, it displays its available skills, and allows the user to create automated tasks by specifying the required what, when and notification information for each task, by means of an interview. Each assistant can create many instances of the automated task that it is designed to set up. In other words, an assistant is a collection of skills, which can be multiply instantiated to produce any number of task instances.

The assistant collects the parameters needed to define a task by means of an interview sequence. Each sequence comprises an introduction, a what specification sequence, a when specification sequence, a notification specification sequence and a closing, to provide a consistent interface to the user, regardless of the specific task being automated. When a user chooses the automated form of assistance, by selecting the appropriate button 34 in the access window displayed in FIG. 2, the parts of the interview sequence are presented to the user, to fully specify the automated task. This operation will now be explained with reference to a specific example illustrated in FIGS. 3A–6.

Figure 3A:
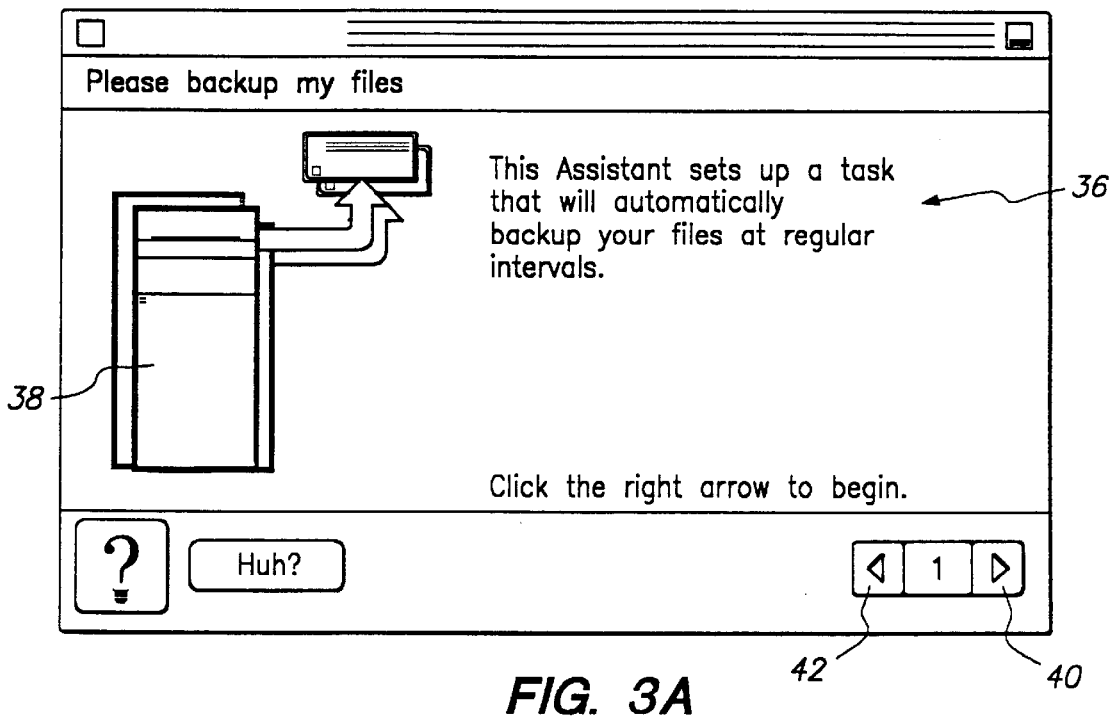
FIGS. 3A–3D, 4A–4B, 5A–5B and 6 are illustrations of interview panels for setting up an automated task.

Referring first to FIG. 2, the illustrated example pertains to the situation in which the user has selected the entry "Please back up my files" from the right pane 28 in the access window, and then actuated the "Automate It" button 34. In response thereto, an introductory panel such as that shown in FIG. 3A is presented to the user. In this panel, the assistant provides a message 36 that introduces the user to its particular skills. In this case, that skill is the ability to automatically back up files at regular intervals. In addition to the description of its skills, the introductory panel contains a task icon 38 which provides the user with a meaningful indication of the task that will be created.

Each panel which forms part of the interview sequence includes a suitable control mechanism that allows the user to navigate through the interview sequence. Referring to FIG. 3A, in the illustrated example this mechanism comprises a pair of buttons 40 and 42 located in the lower right corner of the panel. The numeral "1" displayed between these two buttons indicates that this is the first panel of the interview sequence.

Figure 3B:
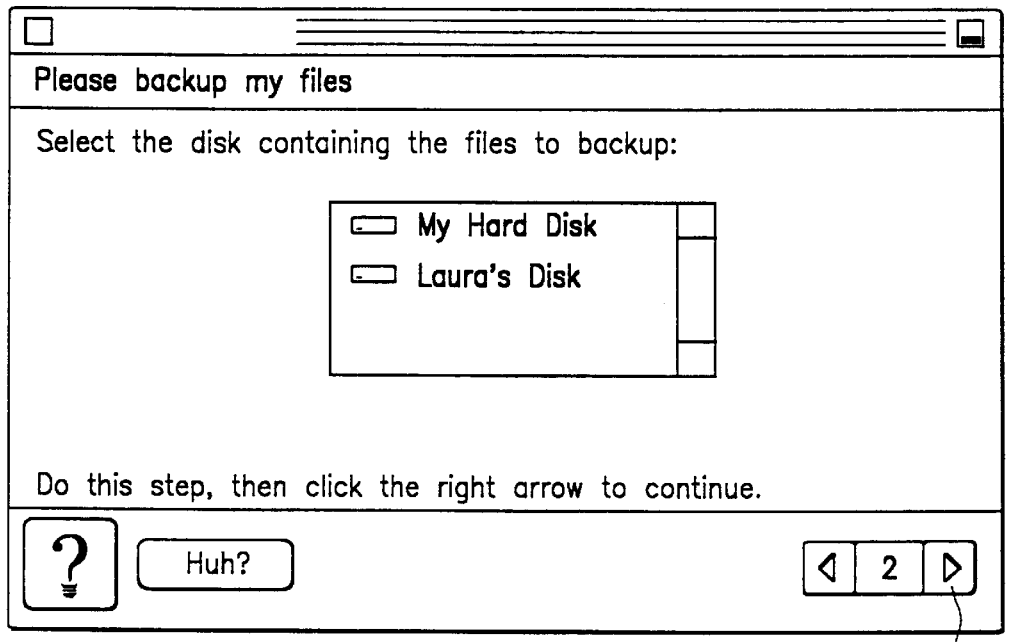
Figure 3C:
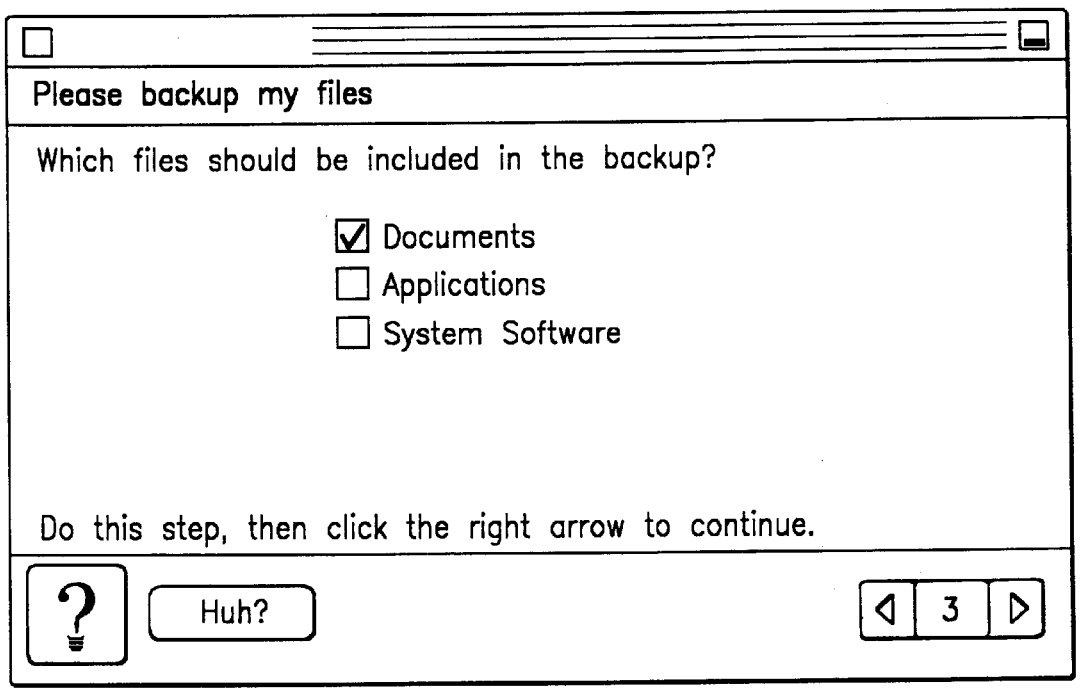
Figure 3D:
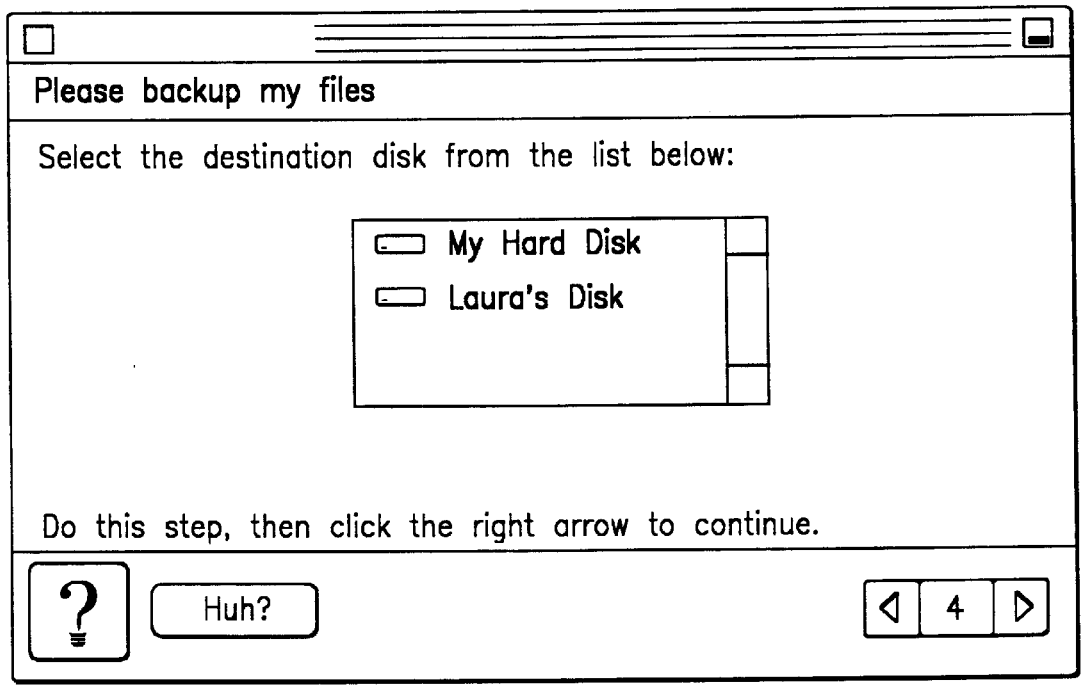

By clicking the right arrow button 40, the interview sequence proceeds to the second panel, illustrated in FIG. 3B. In this panel, the user is requested to identify the disk which contains the files that are to be backed up. After selecting the appropriate disk, the right arrow button 40 is actuated, to present the next panel in the sequence, which is shown in FIG. 3C. In this panel, the user specifies the particular types of files that are to be included in the backup procedure. Finally, in the fourth panel of FIG. 3D, the user indicates the disk onto which the backed-up files are to be copied.

This sequence of panels comprises the "what" portion of the task specification. The specific information presented in the panels is determined by the developers of the code for the particular task being automated. Depending upon the nature of the task, users can perform certain kinds of actions and make selections as part of the interview process. For example, if a task involves completion of a form, such as an expense report, the assistant for that task can display the form, guide the user in filling it out, and route it to selected recipients, if appropriate.

Figure 4A:
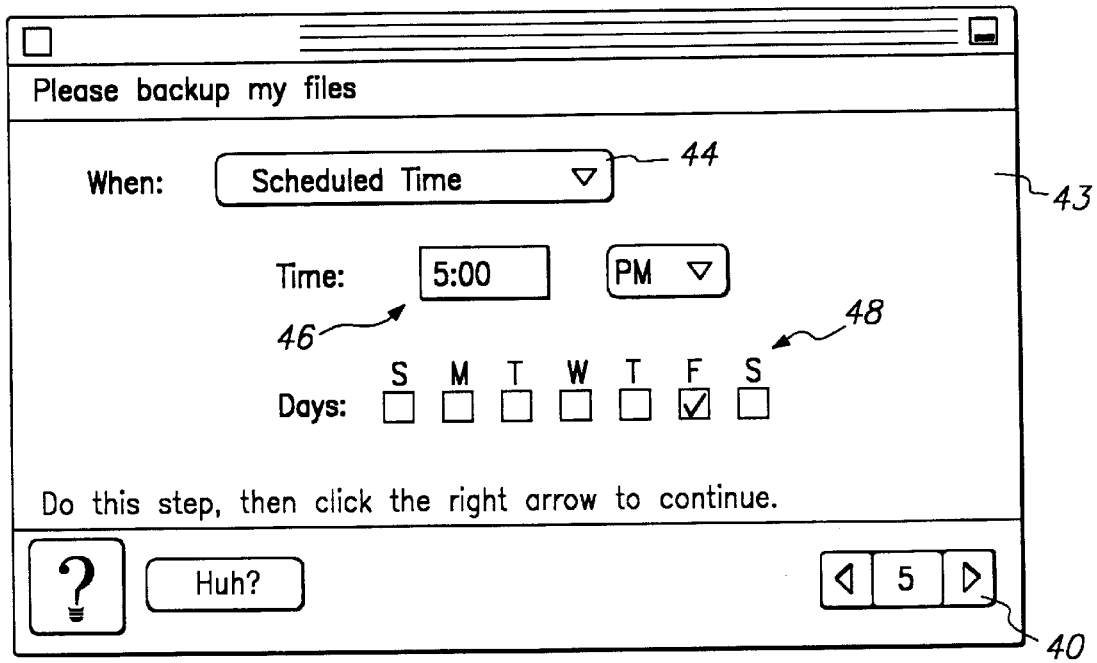

After completing the what specification for a task, the user is prompted to specify when this task should be carried out. The panel for obtaining this information is illustrated in FIG. 4A. In this particular example, the user is requesting that the files be backed up at 5:00 p.m. every Friday. Located in the upper portion of the main pane 43 of the panel is an information box 44 which indicates that the task is to be performed at a scheduled time. Additional user input elements 46 and 48 are displayed for specifying the particular time and day of the week at which the task is to be performed.

Figure 4B:
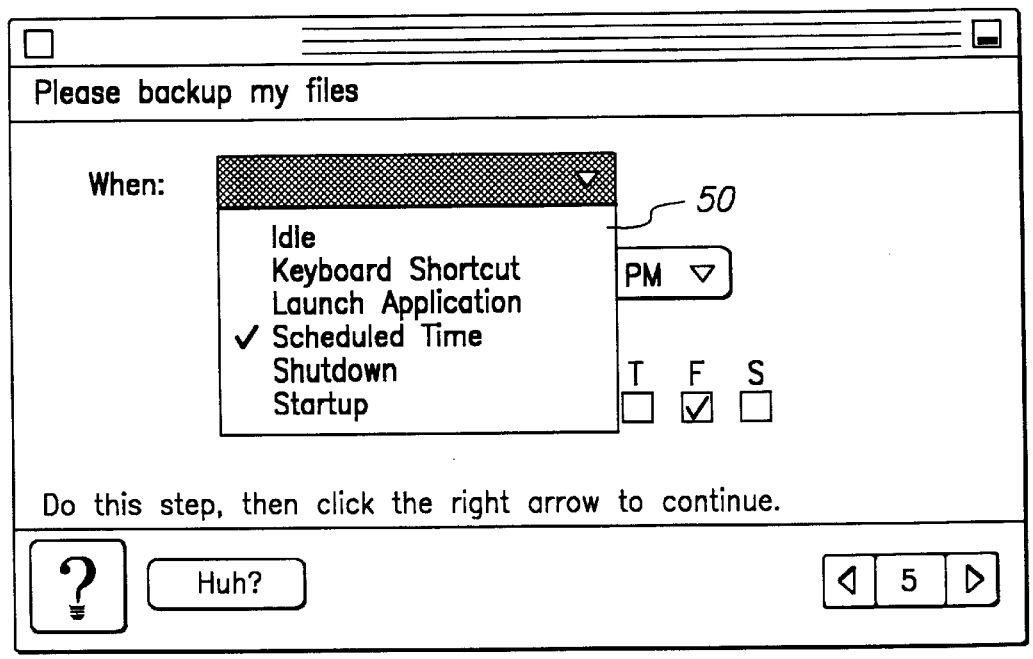

Rather than occurring at a predetermined time, it is also possible to trigger the task on the basis of other detectable events. For example, the user may desire to back up the files each time the computer is turned off. To specify one of these other types of triggering events, an arrow button in the "When:" box 44 can be actuated, to call a pop-up menu of the available types of triggering events. An example of such a menu is shown in FIG. 4B. As can be seen, therein, the pop-up menu 50 provides the user with various choices as to the different types of events that can be employed to trigger a task. Rather than time-related events, other programmatically detectable events can be selected to instantiate a task, such as the launch of an application program or shut down of the computer. Depending upon the particular type of trigger event chosen by the user, the appropriate interface elements 46 and 48 are displayed within the pane 43 to allow the user to specify the parameters associated with that event.

The same triggers are generally available for all of the tasks that can be automated. If desired, a default trigger can be specified for each task, which automatically appears in the information box 44 during the interview sequence. Users can select other triggers through the pop-up menu 50 if the default is not desired. In this regard, the list of available triggers can be limited to only certain types of triggering events for any specific task, or special triggers can be created for individual tasks.

Figure 5A:
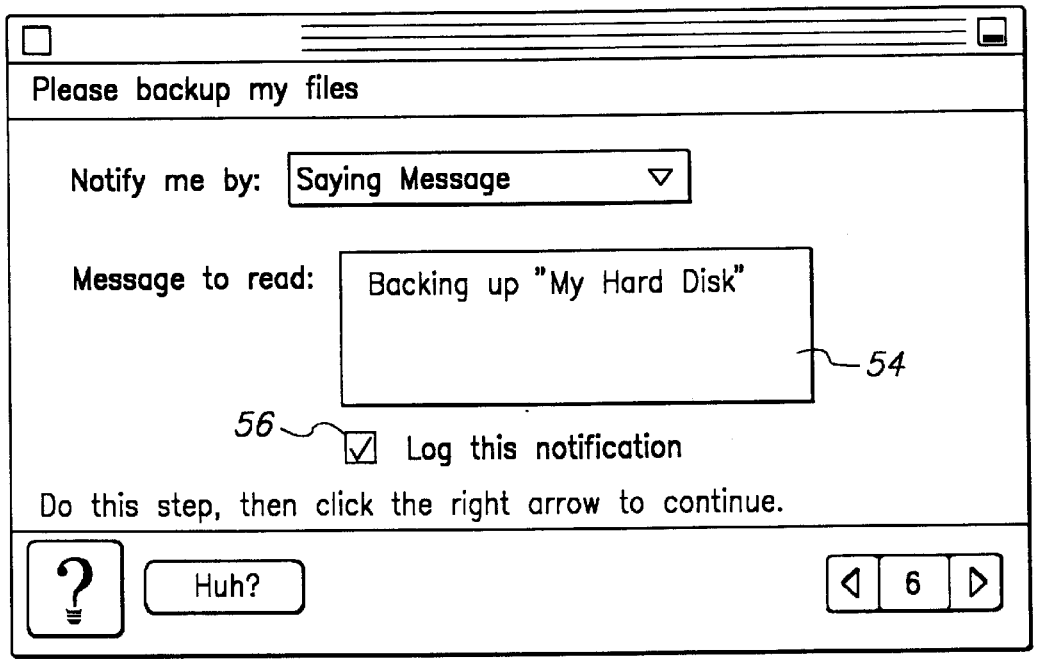
Figure 5B:
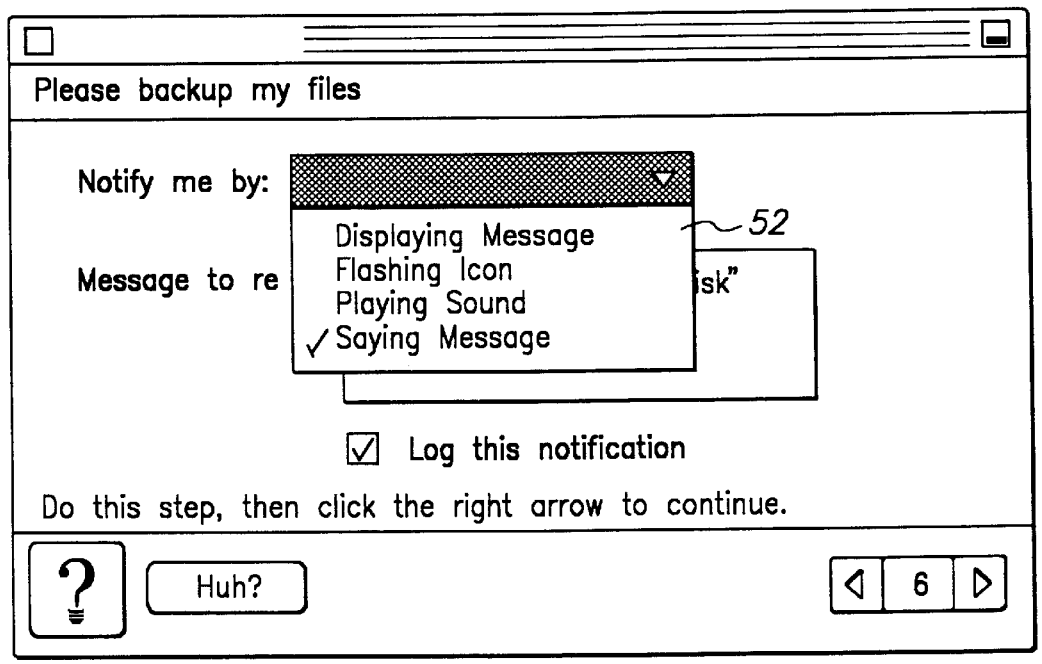

After the user has completed the when specification, and clicked on the right arrow button 40 for that panel, he or she is prompted to specify the form of notification that is to occur when the task is performed. This information is provided by means of the notification specification panel illustrated in FIG. SA. Similar to the when specification panel, this panel includes a pop-up menu 52 that allows users to switch between the various types of notifications available on their computers, as shown in FIG. 5B. For example, the notification might be in the form of a text message, a visual cue such as a flashing indicator, sounds, text-to-speech messages specified by the user, or some combination thereof. The notification specification panel also includes a pane 54 that switches to display an interface that is appropriate for the type of notification that has been selected. In the particular example of FIG. 5A, the user has chosen a spoken message for notification. In response thereto, the interface pane 54 provides a listing of the various messages that are available under this form of notification.

Also included in the notification specification panel is a check box 56 which enables the user to indicate whether each notification should be logged into a record. This feature provides the user with an additional means by which to determine that automatic tasks are being successfully carried out.

Figure 6:
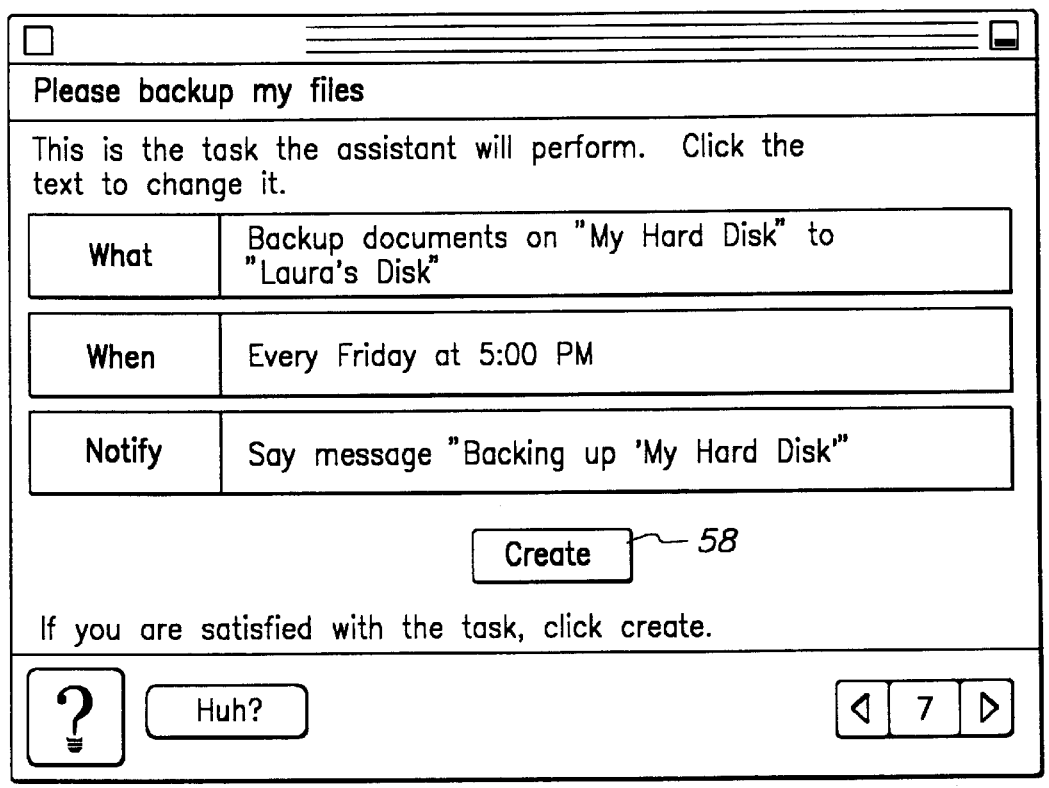

The final panel in the interview sequence is a closure panel, as illustrated in FIG. 6. This panel presents simple text summaries of the what, when and notification specifications, and offers the user another chance to edit them before creating the automated tasks. Once a user is satisfied with the information specifying the task, acceptance is confirmed by clicking a Create 58 button. In response thereto, he assistant creates and installs the automated task.

Figure 7:
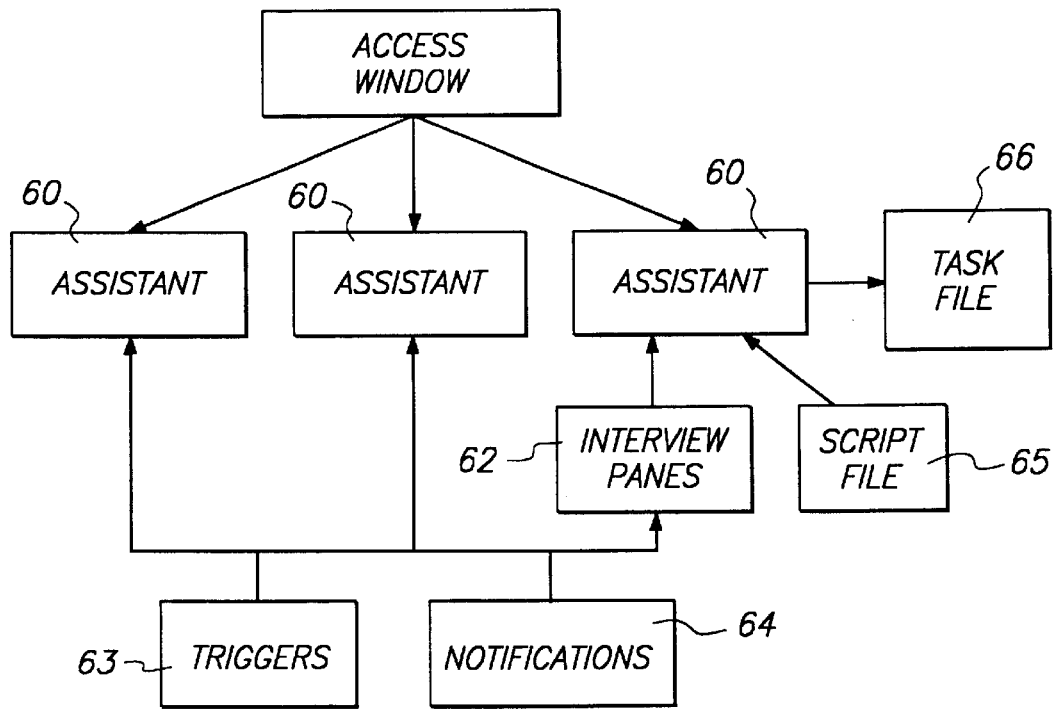
FIG. 7 is a block diagram illustrating the architecture of the assistant portion of the interface for creating an automated task.

The architecture of the assistant portion of the interface is illustrated in FIG. 7. From the access window shown in FIG. 2, the user identifies a particular task to be automated, as described previously. This action causes one of several assistants 60 to be selected. In essence, each assistant represents a different type of task that can be performed. The various assistants are stored in the computer as system-level objects that can be individually selected by the user.

Once activated, the selected assistant controls the presentation of the interview panes 62, as depicted in FIGS. 3A–6. The what portion of the interview process is specific to the task being automated, and presents the user with only those choices that are appropriate in the context of the task. Furthermore, each successive pane that is presented during this portion of the interview process can be adaptively selected on the basis of the user's response to the choices presented in the preceding pane, as well as the state of the user's computer. In other words, the what portion of the interview process assists the user by virtue of the fact that it is inherently tailored to the task and only requests the information needed for that task. Further in this regard, instructional features, such as those described in the aforementioned patent applications, can be employed to guide the user through the interview process.

In contrast to the what specification, the when and notification aspects of a task are not specific to individual tasks. Rather, any of the various triggers and forms of notification can be used with any given task. Preferably, each of the triggers and forms of notification are stored in respective folders 63 and 64 that are accessible by all of the assistants 60.

Once the interview process is completed, the assistant has obtained the user's input regarding all of the necessary parameters pertaining to the task. This information is used to complete a script file 6associated with the task. This completed script file is stored in a task file 66 that also contains information pertaining to the what, when and notification specifications of the task. For instance, in the example given previously, the script file contains the instructions to copy specified files from one disk to another.

Figure 8:
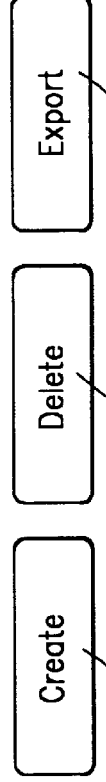

Any number of automated tasks can be created and installed with this approach. A task system window, such as that illustrated in FIG. 8, enables users to view and manage all of the tasks installed on their systems. This window can be opened by an appropriate menu item on the help menu, for example. The automated task window lists all the tasks that are currently scheduled to run on the system, as well as others that may have been created but are not currently active. Referring to FIG. 8, each task is listed once, in a separate row of the window. The rows contain several cells of information which describe the task. The left column of cells is labeled the "task" column. This column displays the distinctive icon 38 for each task that has been created. The next column comprises a listing of the "What" specifications for the tasks. It presents a textual description of the functions to be accomplished by the respective tasks. The third column comprises the "When" specifications for the tasks. The listings in this column comprise a textual description of the triggering condition that will cause the task to be performed, as specified by the user in the "when" specification sequence.

The fourth column presents a textual description of the Notification mechanisms that will be used when the respective tasks are performed, as also specified by the user. A fifth column presents a symbolic indication of whether each task is enabled or disabled. In the example of FIG. 8, a check mark indicates that the task is enabled, and the international "no" symbol indicates that the task is disabled. The final column in the window comprises the status column. This presents the last notification message that was received when the task was performed. In a typical example, this message displays the time that the task was last successfully completed. If the task resulted in an error, or could not be performed, an error message is displayed in this column.

Figure 9:
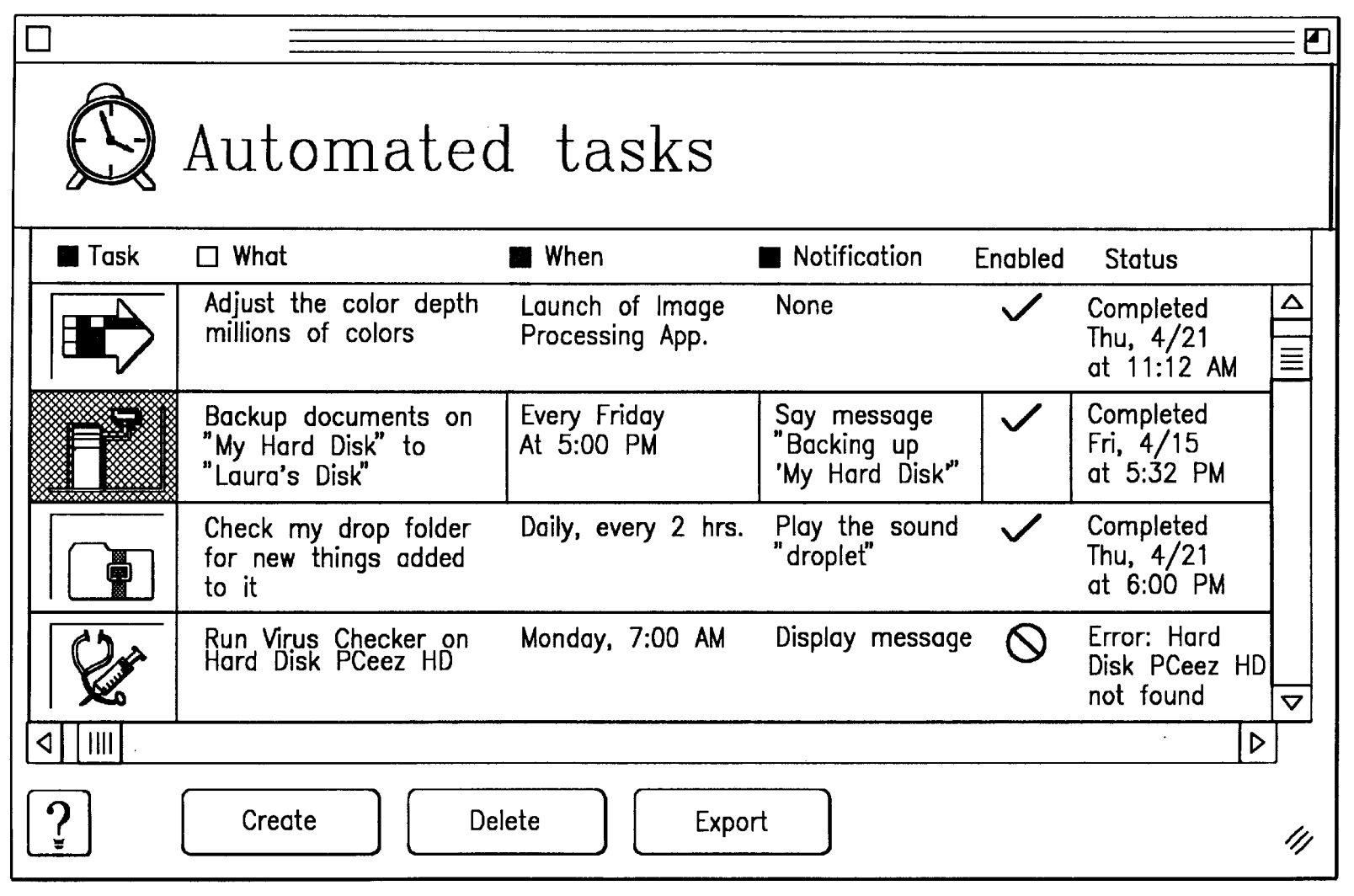

When the automated task window is displayed, the user can click the cursor on any cell in the list. By doing so, this causes a specific task to be selected, and highlights all of the cells in its row. This condition is illustrated in FIG. 9, where the task pertaining to backing up of documents has been selected. When a task is selected, all of the cells in its row are displayed as buttons, to indicate that clicking on one of them will cause an action. For the What, When, and Notification cells, clicking on their respective buttons returns the user to the relevant panes in the interview sequence that enable them to edit those portions of the task. If the button for the Enabled cell is clicked, it toggles the indicator between the enabled and disabled states. Clicking on a status cell calls a reporter window, which is described hereinafter.

The automated tasks window also includes three buttons located at the lower portion thereof. A Create button 67 creates a new task in the list. When the user clicks this button, he or she is prompted to insert the appropriate information for the creation of the task, for example through an interview sequence provided by an assistant.

The Delete button 68 deletes a selected task, and the Export button 70 causes a copy of the currently selected task to be saved to a file folder or some other designated location.

As an alternative to selecting a task and then clicking on one of its cells, the editing of a task can also be directly carried out by double-clicking on any cell within the automated task window, which automatically retrieves the appropriate portion of the interview sequence.

Figure 10:
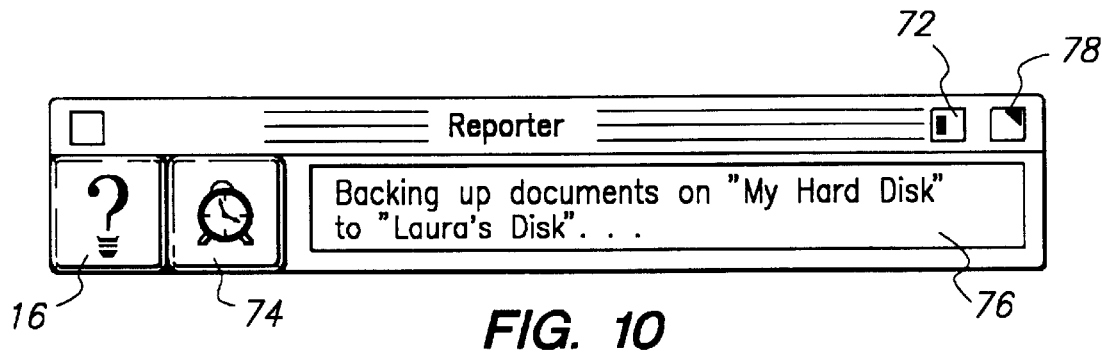
FIGS. 10 and 11 are illustrations of a reporter window in an intermediate and a fully-open state, respectively.

Another feature of the assistance interface is a reporter window that allows the user to monitor task activity. This window is a system window that reports automated task status messages and notifications. It also maintains a log of past messages for automated task activities. The reporter window can be accessed through the floating pallet that displays the assistance help button, illustrated in FIG. 1B. This pallet includes a zoom box 72 in the upper right corner thereof. By clicking on this box, an intermediate state of the reporter window is displayed, as illustrated in FIG. 10. Referring thereto, the reporter window includes the assist button 16, which functions in the manner described previously to display the help access window. Located adjacent the assist button is a clock button 74, which can also be used to open the automated task window illustrated in FIG. 8, and thereby provide a listing of scheduled tasks. The right hand side of the reporter window illustrated in FIG. 10 includes a status message display area 76. Within this area are presented task-related status messages or notifications as tasks are being performed. The specific example in FIG. 10 illustrates a notification being provided as the files on a disk are being backed up.

Figure 11:
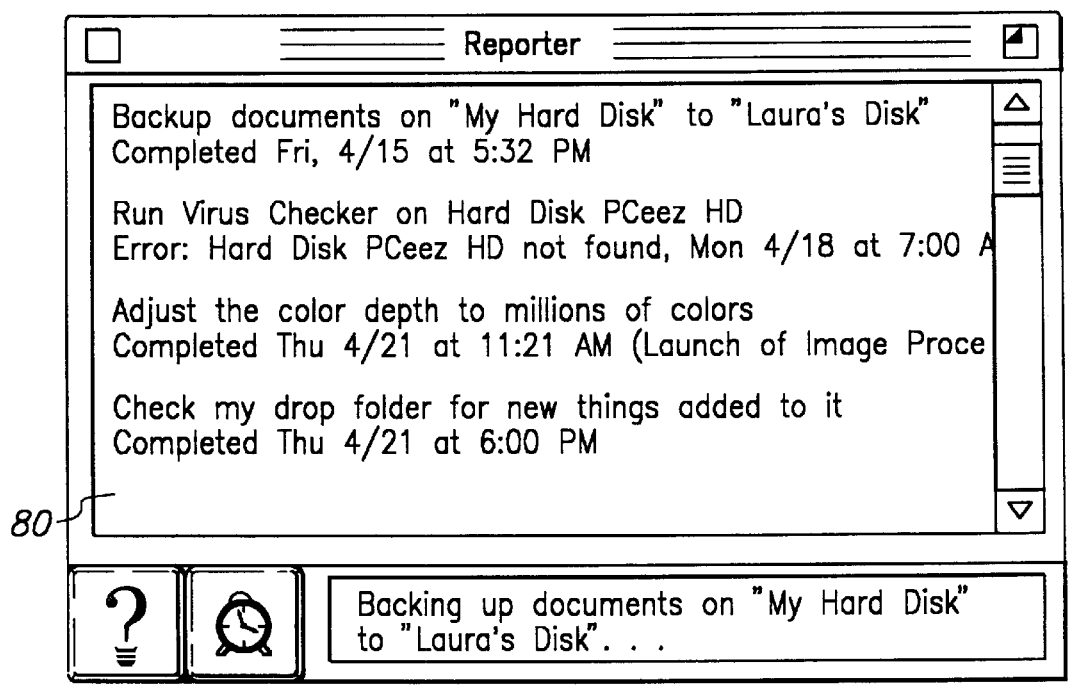

As illustrated in FIG. 10, the reporter window in its intermediate state includes a zoom box 72 and a minimize box 78. If the minimize box is actuated, the window returns to the minimized state illustrated in FIG. 1B. Alternatively, if the zoom box 72 is actuated, the window expands to its fully open state, as shown in FIG. 11. In this state, the window includes all the features of the intermediate state, plus a log pane 80. This pane presents a scrollable text field containing past status messages and notifications. These messages can be maintained in a chronological order, or any other suitable arrangement. Preferably, the text in this field can be selected and copied by the user.

As noted previously, when a status cell for a task is clicked in the automated task system window of FIG. 8, the reporter window is displayed. Preferably, when this action occurs, the particular row in the log pane which pertains to that task is highlighted for ready reference and access by the user.

As described previously, each time that an automated task is created, a task file is created. The task file contains all of the information required to define a task, including the what, when and notification specifications, as well as pointers to any related files that may be needed by the task as it is being carried out. For example, if a task is designed to play a recording that simulates the ignition of an engine each time a disk drive is started, a pointer in the task file can refer to the location of the file containing the recorded sounds.

Figure 12:
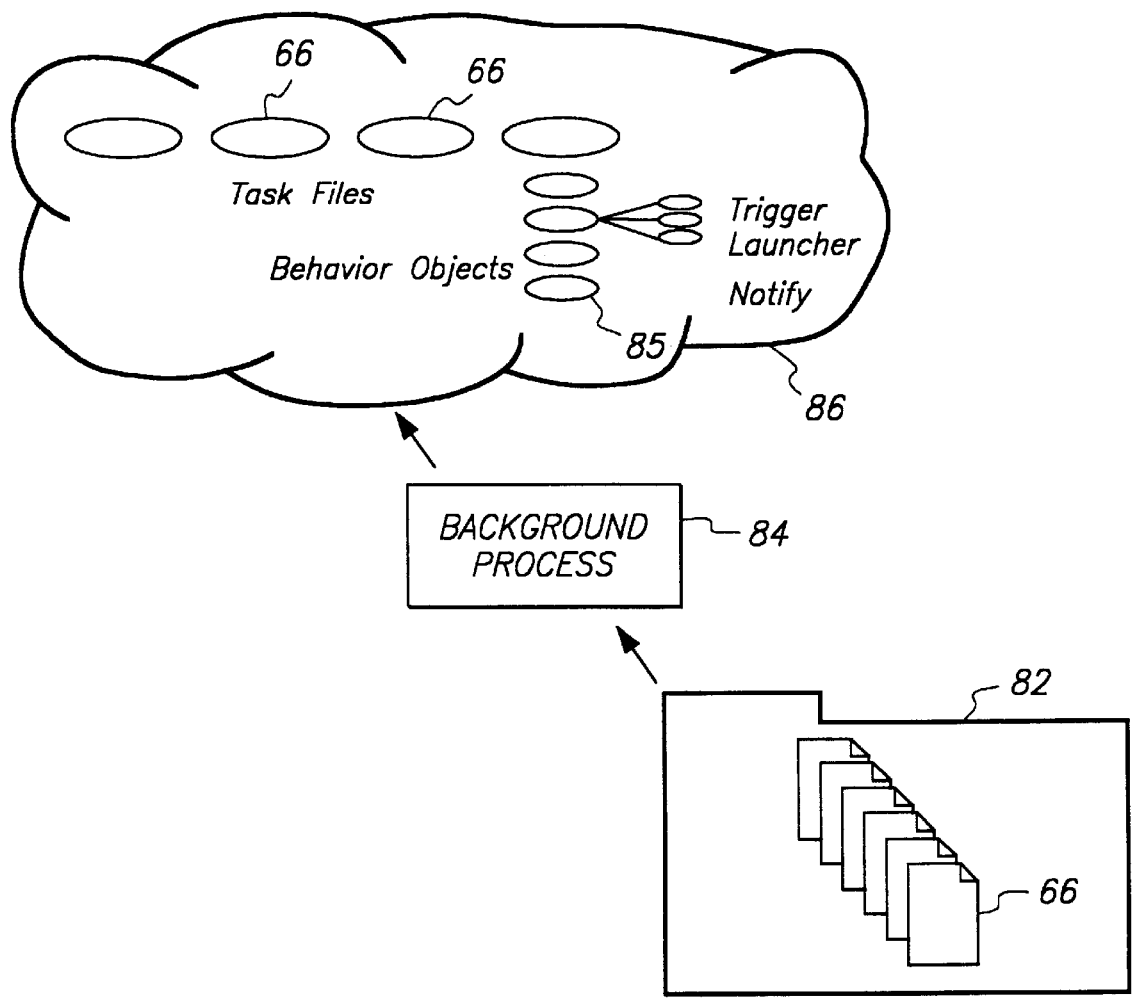
FIG. 12 is a general block diagram of the architecture for controlling the instantiation of tasks.
Figure 13:
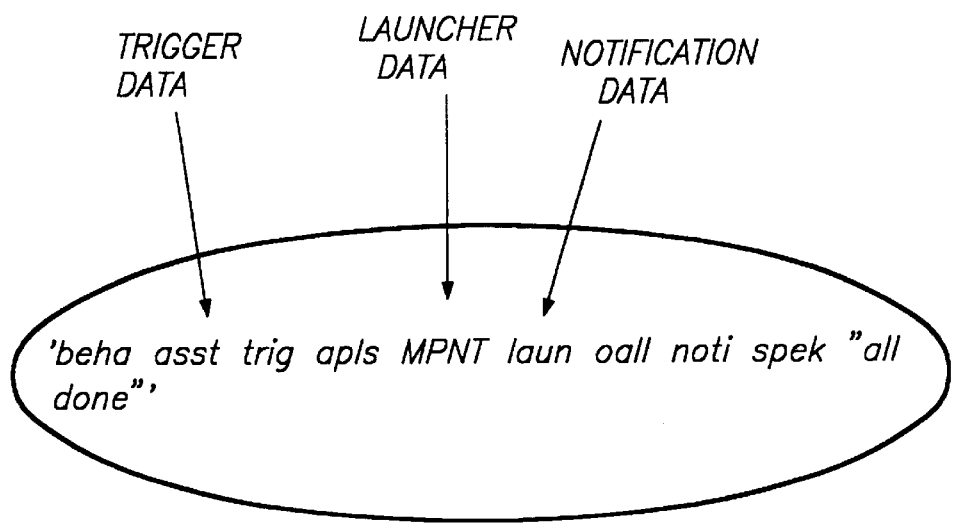
FIG. 13 is an example of a behavior resource data string.

Referring to FIG. 12, all of the task files 66 are stored in a folder 82 of scheduled items. The files in this folder are monitored by a process 84 that runs in the background, i.e., its operation is transparent to the user. In operation, the background process scans each file in the scheduled tasks folder to identify behavior resources that describe the what, when and notification specifications. An example of a behavior resource is illustrated in FIG. 13. Essentially, the resource comprises a string of data consisting of trigger data that relates to the when specification, launcher data that relates to the action to be carried out, and notification data. For each such behavior resource in a task file, the background process 84 establishes and stores a behavior instance or behavior object 85 in a portion of memory 86.

Figure 14:
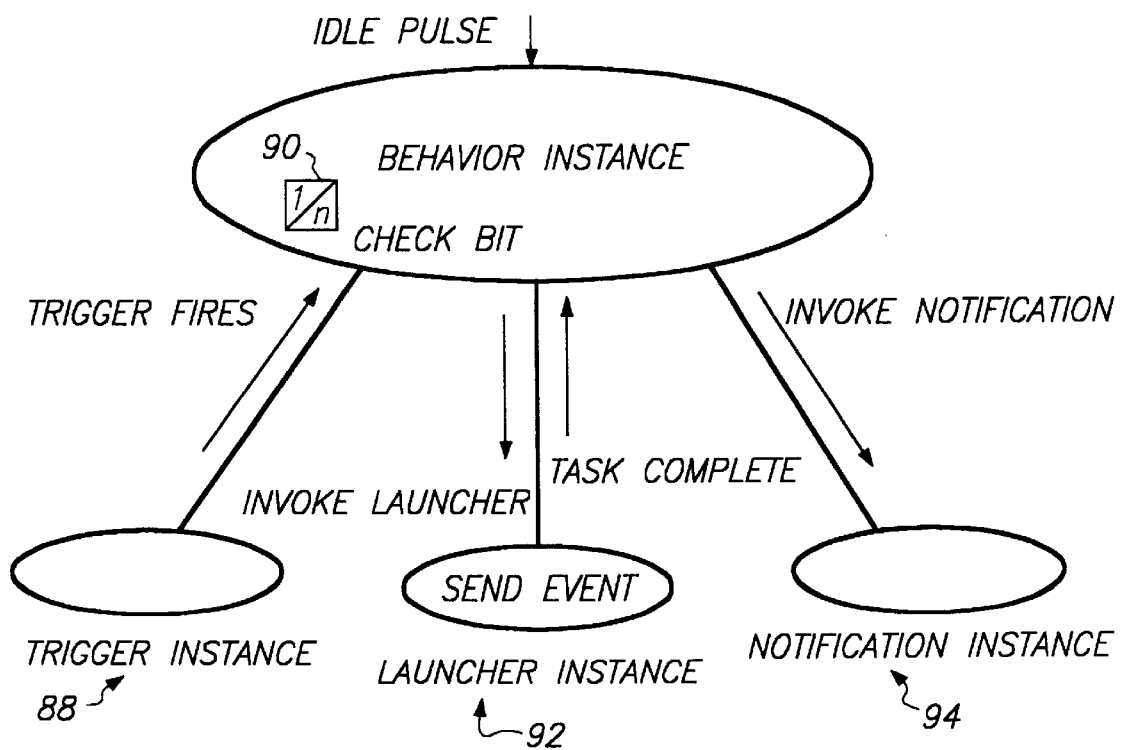
FIG. 14 is a block diagram of the architecture of a behavior instance.

The architecture of a behavior instance is illustrated in FIG. 14. It separates the three specifications that define a task into separate instances and orchestrates the protocol between them. In operation, a trigger instance 88 detects the occurrence of the condition that initiates the performance of the task. For example, if the task is designed to occur at a specified time, the trigger instance can continually poll a clock to determine whether it is that time of day. Alternatively, the trigger instance can cooperate with other operating system services that provide an indication when the scheduled time, or other event of interest, occurs. Thus, the trigger instance might inform a timer service that it needs to be notified when the time of interest is present.

Upon occurrence of the triggering event, the trigger instance sets a bit 90 to indicate this fact. The background process 84 regularly checks this bit, for example each time that an idle pulse is generated. When it detects that the bit has been set, the process 84 invokes a launcher instance 92. In response thereto, the launcher instance causes the specified action to occur, e.g., play a sound recording or copy files onto a backup disk. When the task has been completed, a notification instance 94 is then invoked to provide the notification that forms the final portion of the task.

As illustrated in FIG. 14, each of the elements of a task, i.e. the subject or what portion, the trigger and the notification, are present as individual system objects. This separability of these features contributes to the flexibility and extensibility of the present invention. More particularly, the user is given the freedom to match any particular action with any desired trigger and any available form of notification, or no notification at all, in the creation of a task. Furthermore, the application or other program that actually performs the activity of the task need not have any awareness of the task itself. For this reason, tasks can be set up for any executable function without any need to modify the, function itself.

The architecture of this system is open in nature, so that new types of triggering events and notification can be added at any time. More particularly, once a new type of trigger event is created, it can be added to the folder 63 of trigger objects, to provide another choice that is available to the user during the interview process. Similarly, new forms of notification can be added to the folder 64 of notification objects, without affecting any previously existing tasks.

Storing each task in a task file facilitates the manipulation and exchange of tasks among users. For example, a task file can be copied onto a disk and provided to another user to be placed on that other user's computer. Similarly, a task file can be duplicated and its when specification edited to cause the same task to be performed at two different times.

It is possible for a single task file to contain more than one behavior resource For example, a user might set up a task in which a stock monitoring program retrieves stock information three times a day, such as 9:00 a.m., 1:00 p.m. and 4:30 p.m. Each separate time relates to a different triggering event, and therefore a separate behavior resource. However, since all three tasks share certain common information, such as the particular stocks to be monitored, they can be placed in the same task file. This common information, which pertains to parameters of the task other than the specific what, when and notification specifications, is also stored in the task file, separately from the behavior resources.

In operation, when the background process 84 detects that a task file has more than one behavior resource, it sets up a separate behavior instance for each resource, so that each triggering event can be separately detected and acted upon.

Figure 15:
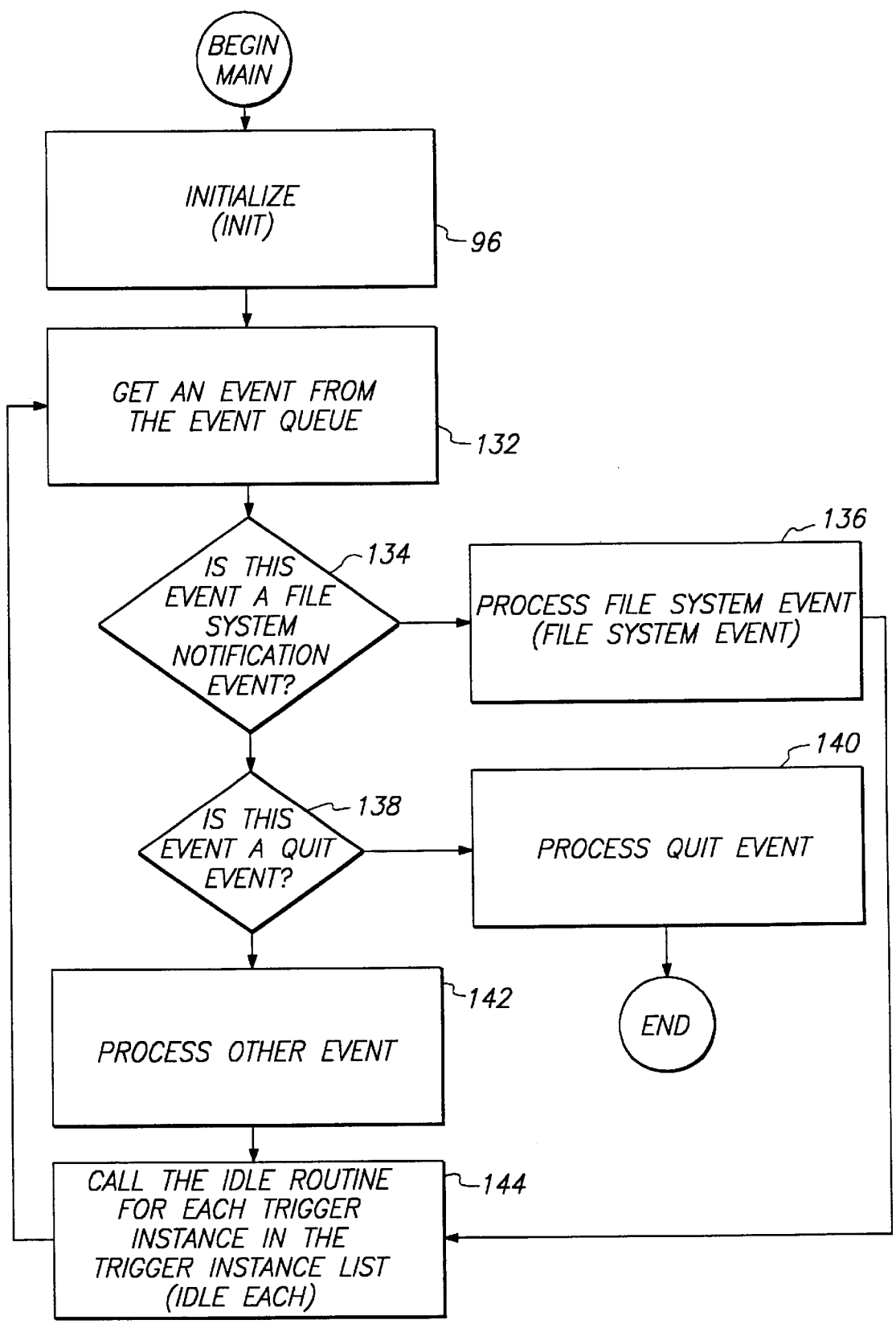
FIGS. 15–20 are flowcharts illustrating the operation of the background process for controlling the instantiation of automated tasks.
Figure 16:
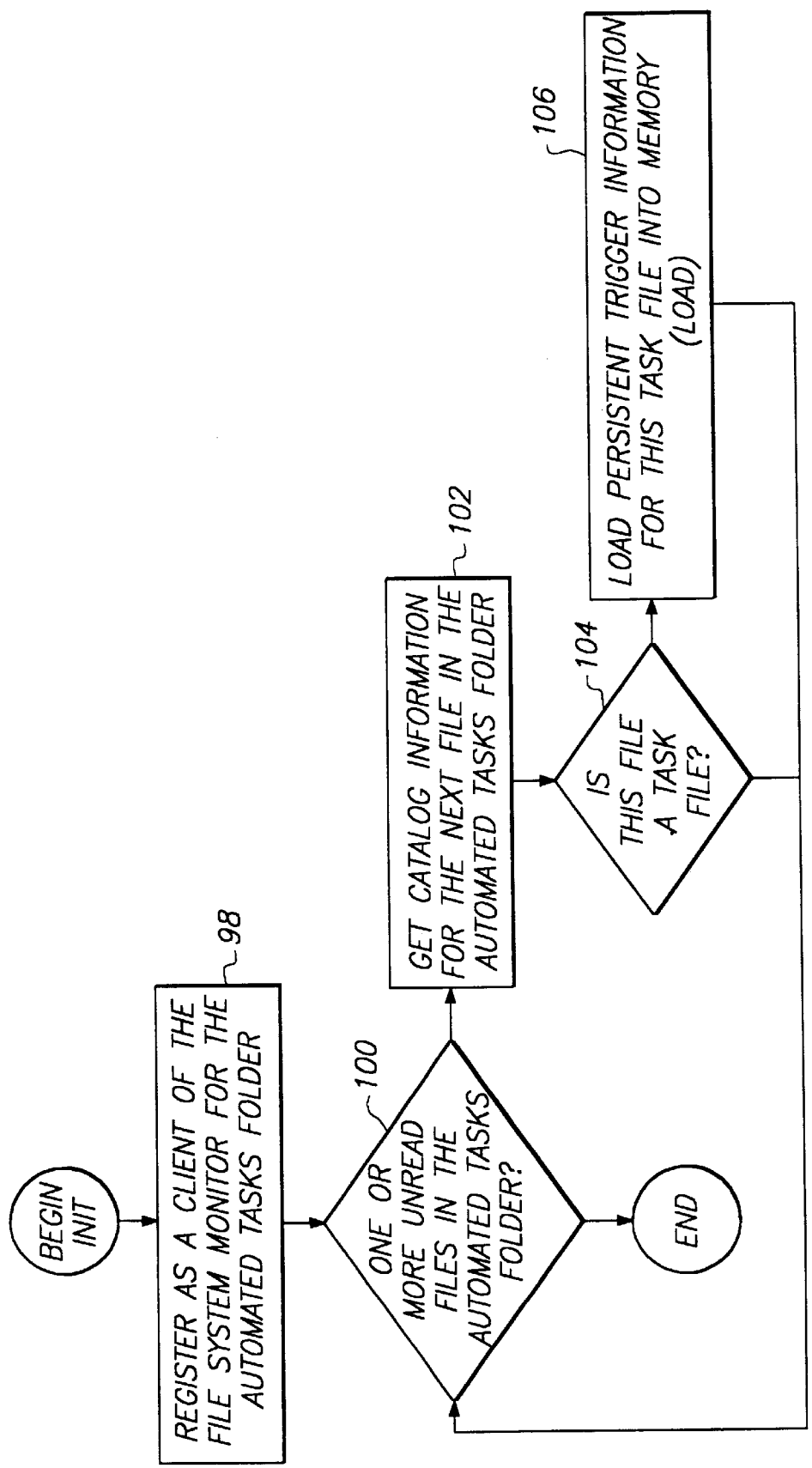

The operation of the background process 84 is explained in greater detail hereinafter with reference to the flowcharts of FIGS. 15–20. The main routine for this process is depicted in FIG. 15. Referring thereto, at Step 96 when the background process is called, it first goes through an initialization subroutine INIT. The steps of this subroutine are illustrated in the flowchart of FIG. 16. At Step 98, the background process registers itself as a client of the file system. In essence, in this step the background system informs the computer's operating system of its presence and its desire to receive a message whenever any activity occurs within the scheduled tasks folder 82. After registering itself, the background process examines the files in the folder. At Steps 100–104, the process looks at each file in the folder to determine whether it is a task folder, i.e. does it contain a behavior resource. If so, it calls a LOAD subroutine at Step 106, for loading persistent trigger information into memory.

Figure 17:
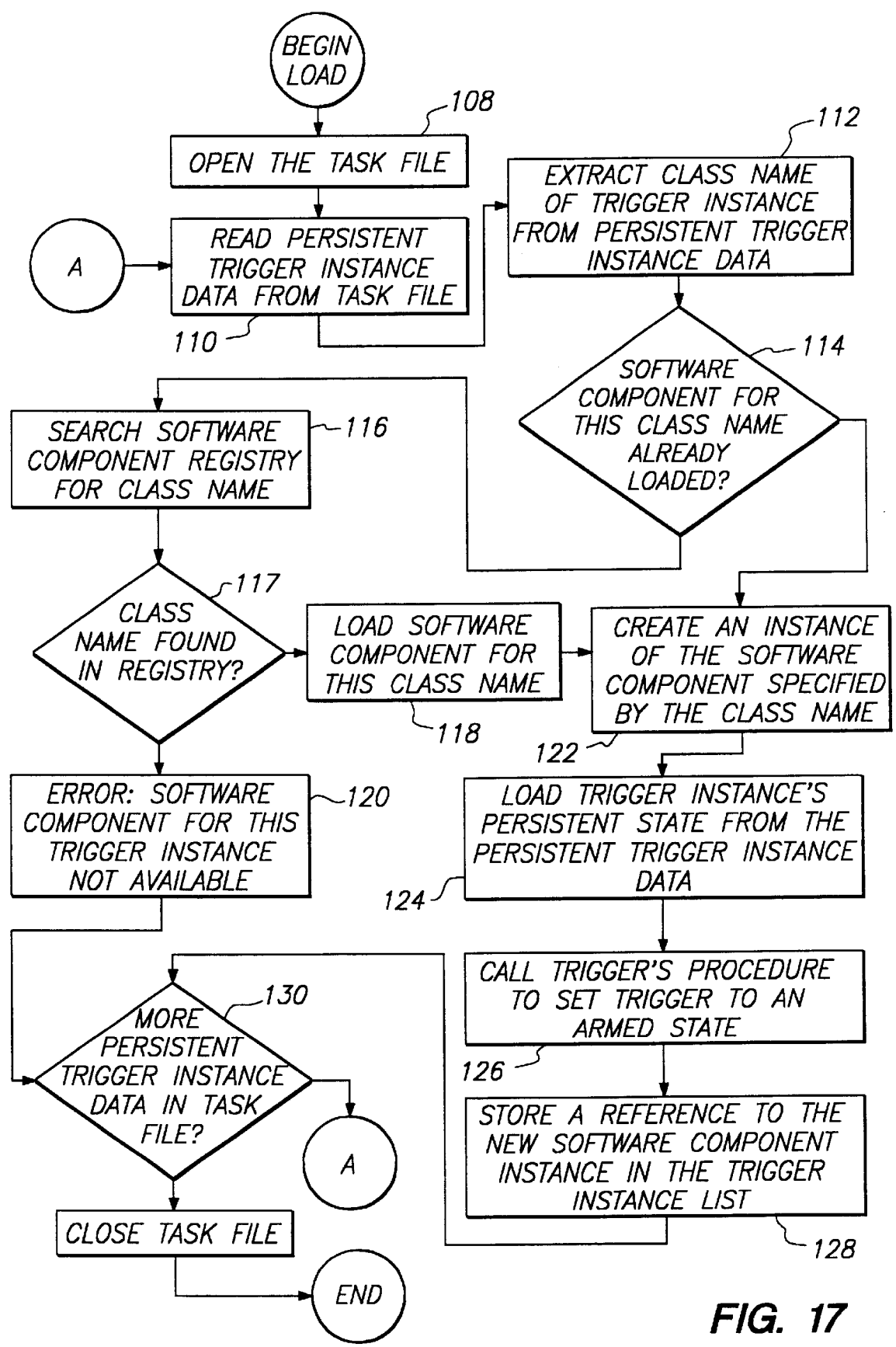

The steps of the LOAD subroutine are illustrated in the flowchart of FIG. 17. At Step 108, the process opens the task file that was selected in Steps 100–104, and reads the trigger instance data from the behavior resource in the file (Step 110). From this data, the process obtains a class name for the trigger instance (Step 112). This name identifies the type of trigger that is associated with the task, e.g. whether it takes place at a scheduled time, or in response to a keyboard event, or upon the opening of a file. At Step 114, the process determines whether a software component for creating this class of trigger has already been loaded. If not, a determination is made at Steps 116 and 117 whether such a component is available, and if so it is loaded at Step 118. If the component is not available, an error message is returned at Step 120.

Once the software component has been loaded, or if it is already present, a trigger object for that class of trigger is created at Step 122. At this point, the newly-created trigger object is generic in form, and so at Step 124 it is provided with information from the trigger instance data pertaining to this particular task. For example, if the trigger is one that occurs at a scheduled time, the information from the trigger instance specifies that particular time and day(s) for the trigger. Thereafter, at Step 126, the trigger's procedure is called to cause the trigger to arm itself. The background procedure then adds a reference to this new trigger object in a trigger instance list (Step 128).

After carrying out these steps with respect to one trigger instance at Step 130, the background process determines whether there is additional trigger instance data in the task file, e.g. if the task file contains more than one behavior resource. If so, the routine returns to Step 110, where the procedure is repeated to create another trigger object. Once all of the required trigger objects have been created for the task, the file is closed and the process returns to Step 100 (FIG. 16). This procedure is repeated, until all of the files in the folder have been examined and the required trigger objects have been created.

Figure 18:
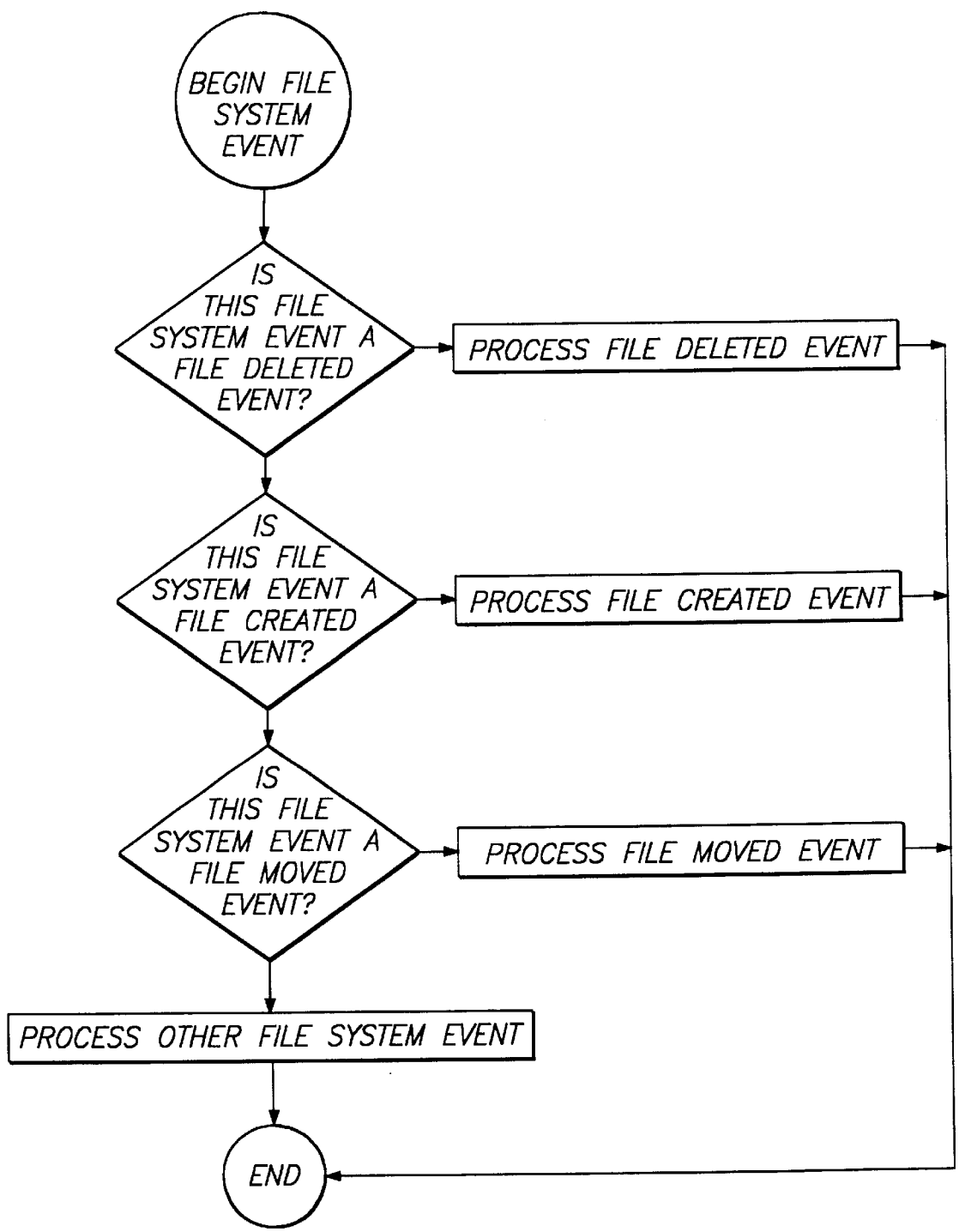

The process then returns to the main routine (FIG. 15), where it proceeds to Step 132. At this step the process retrieves an event from an event queue. Such an event might be a mouse click, a key stroke or a message from a network server, for example. Once the event is retrieved, a determination is made whether the event is a file system notification event (Step 134). If so, a subroutine is called at Step 136 to process the event. This subroutine is depicted in FIG. 18. In essence, this subroutine examines the event to determine whether it pertains to the deletion, creation or movement of a file. If so, the appropriate action is carried out for that type of event. For example, if the user clicks on the Delete button 68 in the automated tasks window of FIG. 9, the task file for the selected task is removed from the computer's memory. If the event is not one of these three specific types, other processing appropriate to the type of event is appropriately carried out.

If the event from the queue is not a file system notification event, a determination is made at Step 138 (FIG. 15) whether it is a quit event. If so, the background process quits at Step 140. If the event is some other type, it is appropriately processed at Step 142.

Figure 19A:
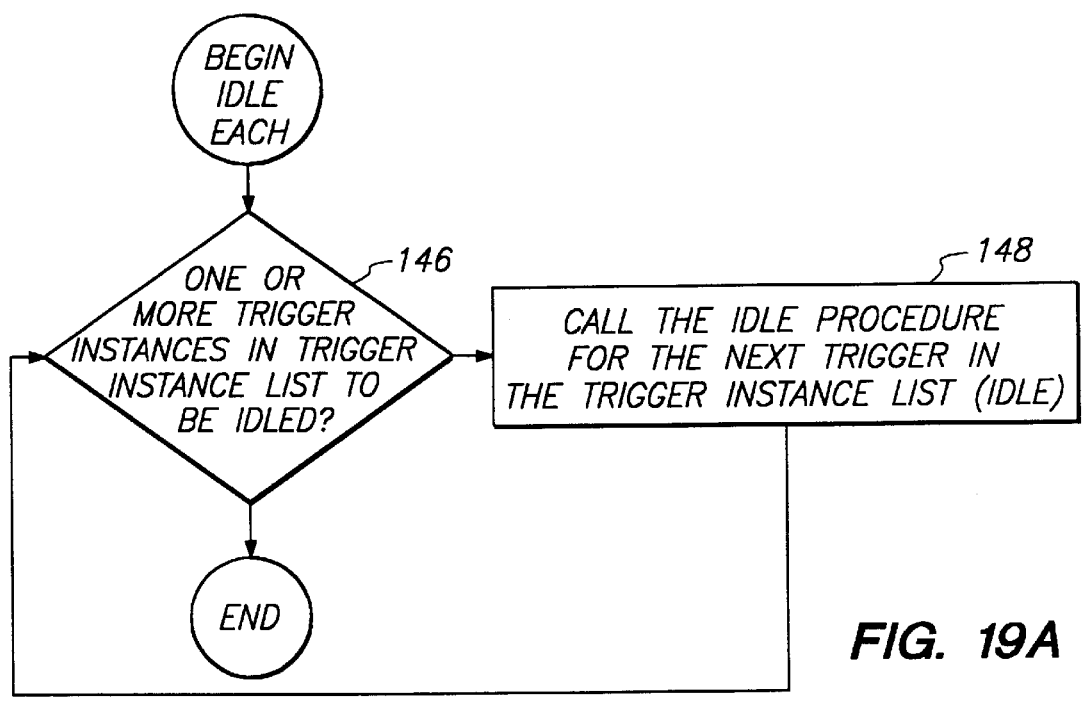
Figure 19B:
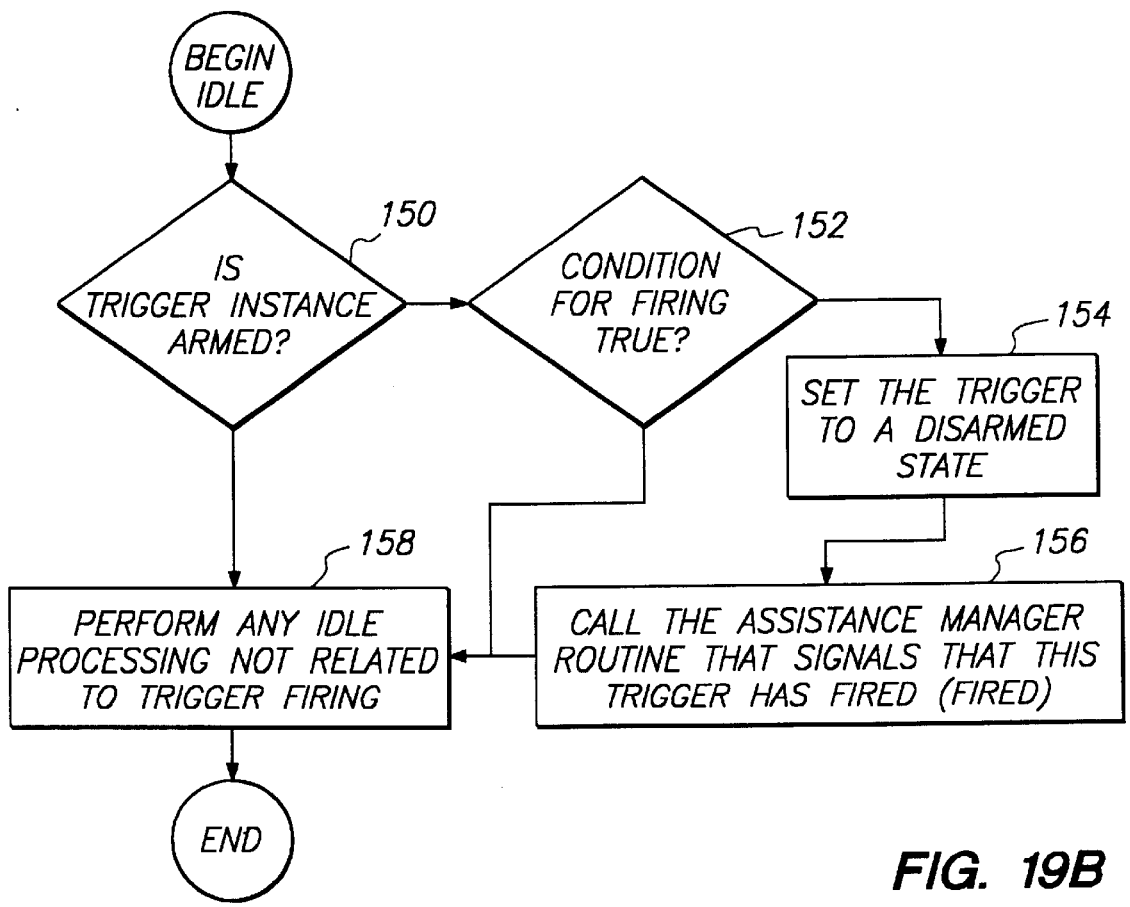

After a retrieved event has been processed, the background process calls an idle routine at Step 144. This routine is depicted in FIGS. 19A and 19B. It functions to sequentially provide each trigger instance with an opportunity to perform any necessary processing, as well as carry out the operations that are to occur when a trigger condition exists. Referring to FIG. 19A, when the idle routine is called it proceeds to Step 146 where it examines the trigger instance list which is updated at Step 128 as trigger objects are created. For each trigger instance in the trigger list, the routine calls the idle procedure at Step 148. This procedure is depicted in the flowchart of FIG. 19B. Referring thereto, at Step 150 the process determines whether the trigger instance is armed, or enabled. If so, at Step 152 it determines whether the firing condition has occurred, e.g. has the trigger been notified that a particular time of day is at hand? This condition might be detected, for example, by checking the status of the bit 90 that is set by the trigger instance (FIG. 14). If the triggering condition has occurred, the trigger is disarmed at Step 154, and a routine is called at Step 156 to indicate that the trigger has fired. If the trigger instance is not armed or the firing condition has not occurred, the idle process proceeds to Step 158, where the trigger instance performs any appropriate idle processing that is not related to trigger firing. For example, if the trigger instance is capable of interacting with the user, such interaction can be carried out at this time.

Figure 20:
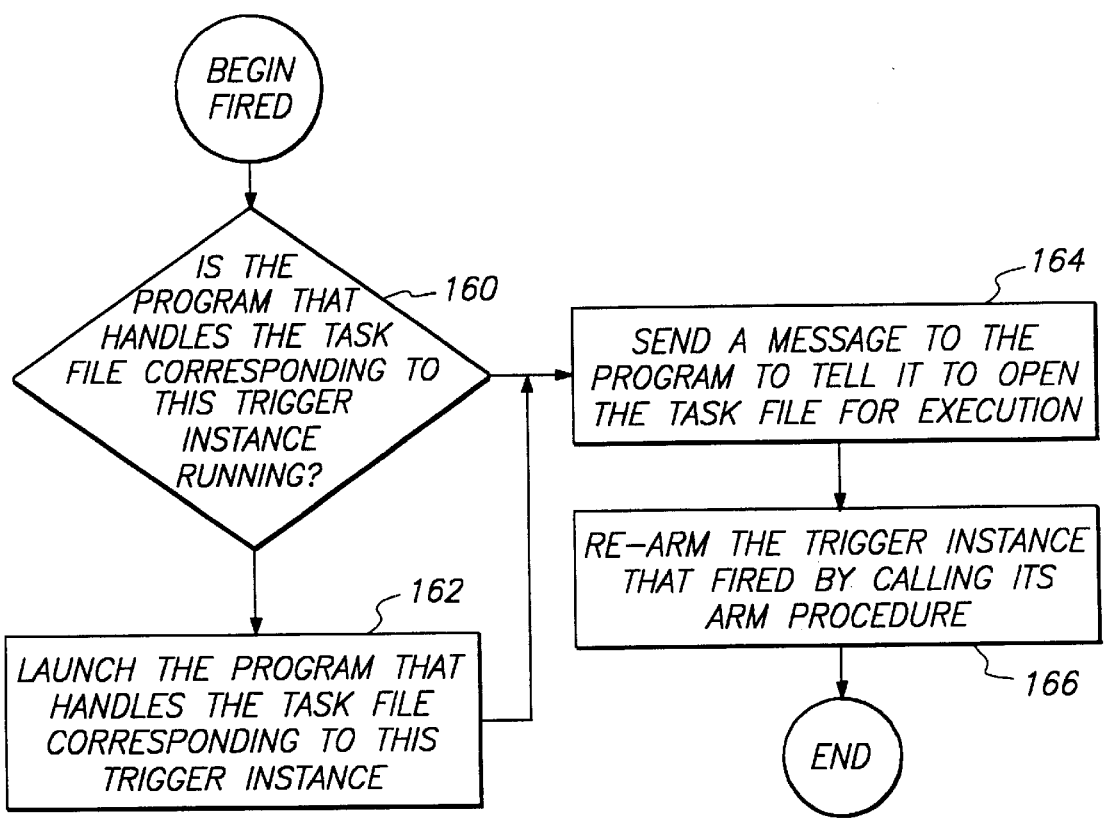

The firing routine that is called at Step 156 is depicted in the flowchart of FIG. 20. When called, the routine first determines whether the program associated with the task file is running (Step 160). For example, if the task is one that updates stock quotes at certain times of the day, a determination is made whether the stock monitoring program is running. If not, it is launched at Step 162. The program is then sent a message at Step 164 to open the task file, where it can obtain the information necessary to carry out the task. For example, the particular stocks whose prices are to be updated can be identified in this file, or a script file can be run. After the task has been completed, the trigger instance is re-armed at Step 166.

The background process continues to operate in this manner to process events and to idle each trigger instance and thereby instantiate each task when its triggering condition occurs.

The creation of tasks has been described thus far in connection with the use of assistants which are called via the "Automate It" button on the access window (FIG. 2). However, this is not the only procedure by which they can be created. Basically, any executable object, such as a script file, an alias, a batch file or the like, can be the subject of a task. To create a task pertaining to such an object, the user can drag the object into the scheduled tasks folder 82. Upon detecting such an action, the background process 84 can call up those portions of the interview sequence which enable the user to set up the trigger and notification specifications for the task, so that the execution of the object is carried out at the desired times.

As a further extension of this concept, the principles of the invention can be applied to files and other objects, to provide them with a form of behavior. For example, if a file contains confidential material, it may be desirable to provide a warning each time the file is opened, to remind the viewer of its confidential nature. To accomplish this objective, the file can be provided with a tag or the like, which serves as an indication to the operating system that the file has certain behavior associated with it. Whenever the file is opened, the operating system provides a notification of that fact to a trigger instance associated with that file. In response thereto, the trigger instance causes a task to be carried out, which in the example given above is the display of the warning message. Other examples of such behavior include the generation of a visual or audible warning message when a specific file is duplicated or deleted, or sending a surreptitious electronic mail message to a security facility or system operator when a specific file is accessed, for usage tracking purposes.

Figure 21:
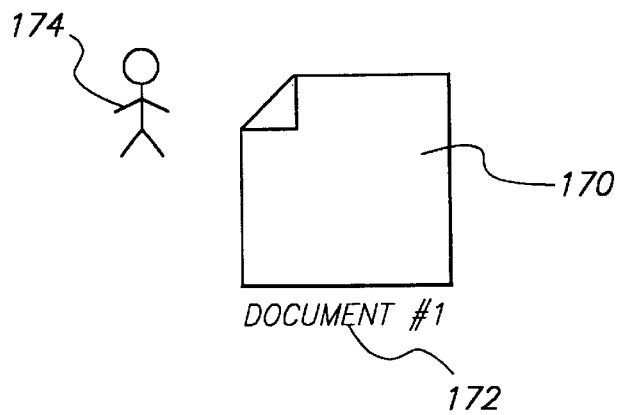
FIG. 21 is an illustration of an icon which includes a behavior indicator.

To notify the user that a file has behavior, an indicator can be associated with its icon. Referring to FIG. 21, a typical file icon includes a graphical element 170 and a name label 172. In accordance with the present invention, an indicator 174 can be displayed along with the icon, to inform the user of the fact that the file has associated behavior. The indicator does not form part of the icon itself, but is displayed with it and moves with the icon. Preferably, the indicator has functionality, so that if the user clicks on it, for example, this action it causes a window to open which displays all of the behaviors associated with the file.

As a further feature, the task files 66 can be used to create partially specified tasks that are completed at run time, to provide additional customization. For example, a user could set up a task to schedule a meeting with a particular group of people. Instead of specifying the date of the meeting, however, a special marker or token can be inserted into a text entry field that is presented as part of the interview sequence. The task file for this task can then be placed in a convenient location where it can be readily accessed by the user, e.g., on the desktop. In essence, this file functions in the manner of a paper task slip that is completed and forwarded to a service organization, when a specific job is to be carried out.

When the task is to be performed, the user accesses the task slip file, for example, by double-clicking on it. Alternatively, the user could drag the file into the folder of scheduled tasks. In response to one of these actions, the interview panels that are needed to complete the specification of the task are presented to the user. Once the needed values have been entered, the task is then carried out.

From the foregoing, it can be seen that the present invention provides a mechanism which permits the user to focus upon the accomplishment of goals, rather than be concerned with how to operate a computer. This functionality is provided through a system which offers the user a great deal of flexibility in configuring a computer to carry out tasks automatically. More particularly, each of the elements of a task. i.e. the action to be performed, the trigger, and the form of notification, resides in the form of an independent operating system level object. The user can mix and match any desired action with any available trigger and form of notification to construct an automated task. This architecture contributes to the extensibility of the system, since a new element, e.g., a new triggering event, can be added at any time without affecting any previously established tasks.

Furthermore, the scheduling of tasks takes place independently of the application programs and other objects that actually perform the desired actions. As a result, there is no requirement that a program be running in order for the task to be instantiated. In addition, any executable action can be made the subject of a task, rather than only those programs which are specifically designed for such a purpose.

It will be appreciated by those of ordinary skill in the art that the present invention can be embodied in other specific forms without departing from the spirit or essential characteristics thereof. The presently disclosed embodiments are considered in all respects to be illustrative and not restrictive. The scope of the invention is indicated by the appended claims rather than the foregoing description, and all changes that come within the meaning and range of equivalence thereof are intended to be embraced therein.

What is claimed is:

1. A system for automatically carrying out tasks in a computer, comprising:

means for storing a plurality of task files, wherein each one of said plurality of task files includes at least a first identification of a first action to be performed and of a first trigger event to initiate performance of said first action;

means for examining said each task file and for creating a first trigger object which provides a first indication when said first trigger event occurs; and means responsive to said first indication, for initiating said performance of said first action.

2. The system of claim 1 wherein said means responsive to said first indication includes means for launching a program which performs said first action.

3. The system of claim 2 wherein at least one of said plurality of task files includes information pertaining to execution of said program.

4. The system of claim 1 wherein at least one of said plurality of task files further includes a second identification of a form of notification to be provided to a user, and wherein said system further includes means responsive to said performance of said first action, for providing said notification to said user.

5. The system of claim 1 wherein said first identification in at least one of said plurality of task files includes a third identification of a second trigger event to initiate performance of said first action, and wherein said means for examining and for creating further creates a second trigger object which provides a second indication when said second trigger event occurs.

* * * * *